US006672835B1

(12) United States Patent
Hughes

(10) Patent No.: US 6,672,835 B1
(45) Date of Patent: Jan. 6, 2004

(54) METHOD AND APPARATUS FOR SELF-CONTAINED VARIABLE PITCH AND/OR CONSTANT SPEED PROPELLER INCLUDING PROVISIONS FOR FEATHERING AND REVERSE PITCH OPERATION

(76) Inventor: Arthur C. Hughes, 3307 Somerset Ct. S.E., Marietta, GA (US) 30067

(*) Notice: Subject to any disclaimer, the term of this patent is extended or adjusted under 35 U.S.C. 154(b) by 0 days.

(21) Appl. No.: 10/440,909

(22) Filed: May 19, 2003

(51) Int. Cl.[7] ............................................. B64C 11/34
(52) U.S. Cl. ........................ 416/36; 416/48; 416/155
(58) Field of Search .......................... 416/27, 30, 36, 416/39, 44, 48, 155

(56) References Cited

U.S. PATENT DOCUMENTS

| | | |
|---|---|---|
| 3,900,274 A | 8/1975 | Johnston et al. |
| 4,227,860 A | * 10/1980 | Humphreys .................. 416/155 |
| 4,533,296 A | 8/1985 | Duchesneau et al. |
| 4,556,366 A | * 12/1985 | Sargisson et al. ........... 416/155 |
| 4,648,345 A | 3/1987 | Wham et al. |
| 4,756,667 A | 7/1988 | Wyrostek et al. |
| 4,900,226 A | 2/1990 | de Vries |
| 5,019,006 A | 5/1991 | Schneider et al. |
| 5,205,712 A | 4/1993 | Hamilton |
| 5,281,094 A | 1/1994 | McCarty et al. |
| 5,284,418 A | 2/1994 | Moriya |
| 5,299,911 A | 4/1994 | Moriya |
| 5,451,141 A | 9/1995 | Carvalho et al. |
| 5,595,474 A | 1/1997 | Girard |
| 5,931,637 A | 8/1999 | Wheeler |
| 5,967,749 A | 10/1999 | Eaves et al. |
| 6,113,351 A | 9/2000 | McCallum et al. |
| 6,261,138 B1 | 7/2001 | Imura |
| 6,422,816 B1 | 7/2002 | Danielson |
| 6,439,850 B1 | 8/2002 | McCallum et al. |

FOREIGN PATENT DOCUMENTS

JP            4328094 A2    11/1992

* cited by examiner

*Primary Examiner*—Edward K. Look
*Assistant Examiner*—Richard A. Edgar
(74) *Attorney, Agent, or Firm*—Myers & Kaplan, LLC; Joel D. Myers; Ashish D. Patel

(57) ABSTRACT

A self-contained variable pitch and/or constant speed propeller including provisions for feathering and reverse pitch operation, wherein no direct contact is required between the fixed engine or airframe and the rotating propeller for effectuation of blade pitch change, therefore eliminating the burdens and complexities general associated with propeller installation, maintenance and blade pitch change operations.

63 Claims, 24 Drawing Sheets

BASIC COMPONENTS
Simple Variable Pitch or Constant Speed Propeller

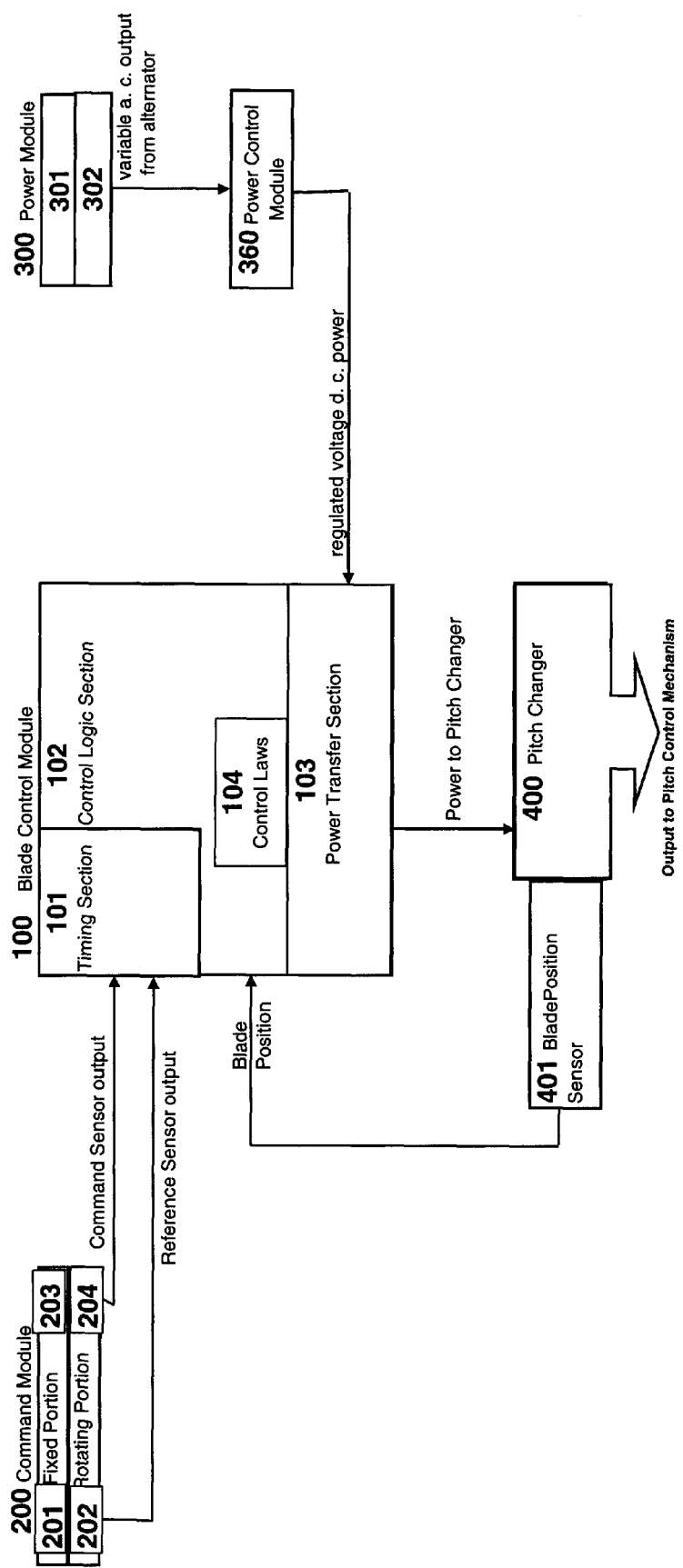

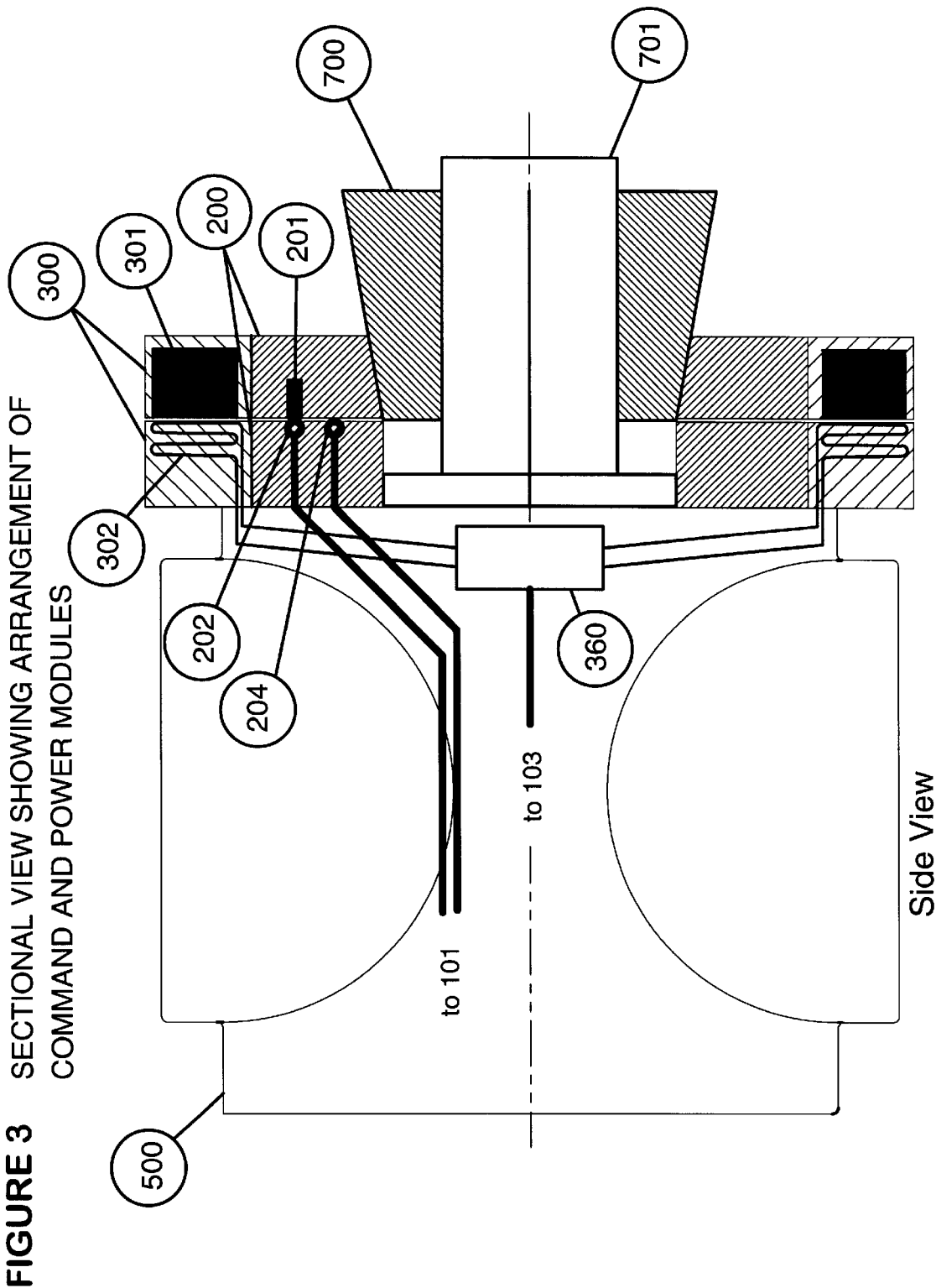
FIGURE 3   SECTIONAL VIEW SHOWING ARRANGEMENT OF COMMAND AND POWER MODULES

REAR VIEW SHOWING REGION CUTAWAY IN FIGURE 3

COMMAND AND CONTROL MODULES
ALTERNATE ARRANGEMENT

COMMAND AND POWER MODULES
ALTERNATE ARRANGEMENT

COMMAND AND CONTROL MODULES
ALTERNATE ARRANGEMENT

COMMAND AND CONTROL MODULES
ALTERNATE ARRANGEMENT

COMMAND MODULE OPERATION

DETERMINATION OF SELECTED OPERATING CONDITION (soc)

BLADE CONTROL MODULE 100 LOGIC FLOW CHART FOR A SIMPLE VARIABLE PITCH PROPELLER

FIGURE 6a
CONTROL LAWS 104 FOR A SIMPLE VARIABLE PITCH PROPELLER
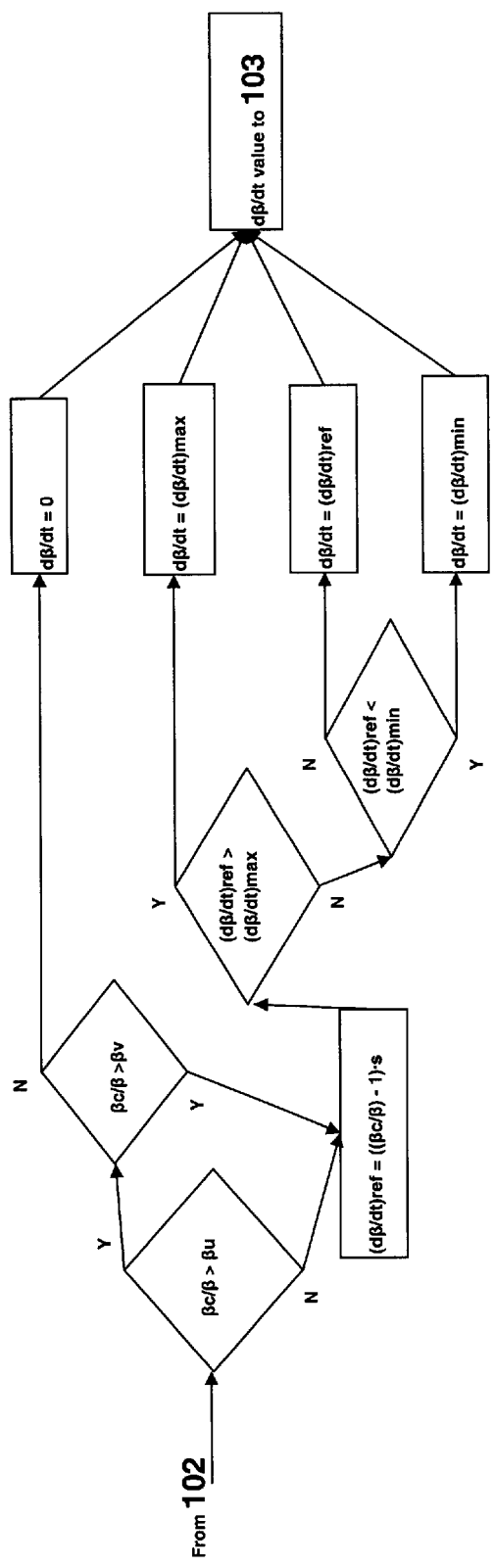
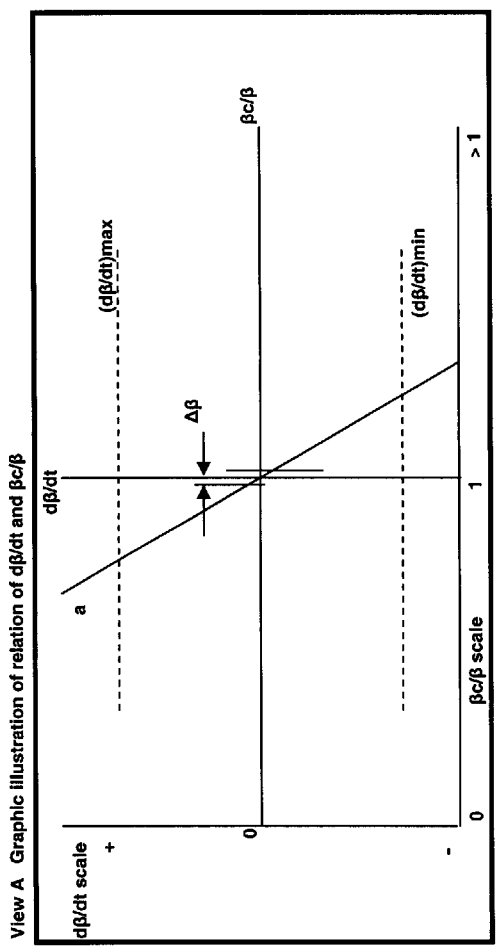
View A  Graphic Illustration of relation of $d\beta/dt$ and $\beta c/\beta$

BLADE CONTROL MODULE 100 LOGIC FLOW CHART FOR A SIMPLE CONSTANT SPEED PROPELLER

FIGURE 7a
CONTROL LAWS 104 FOR A SIMPLE CONSTANT SPEED PROPELLER
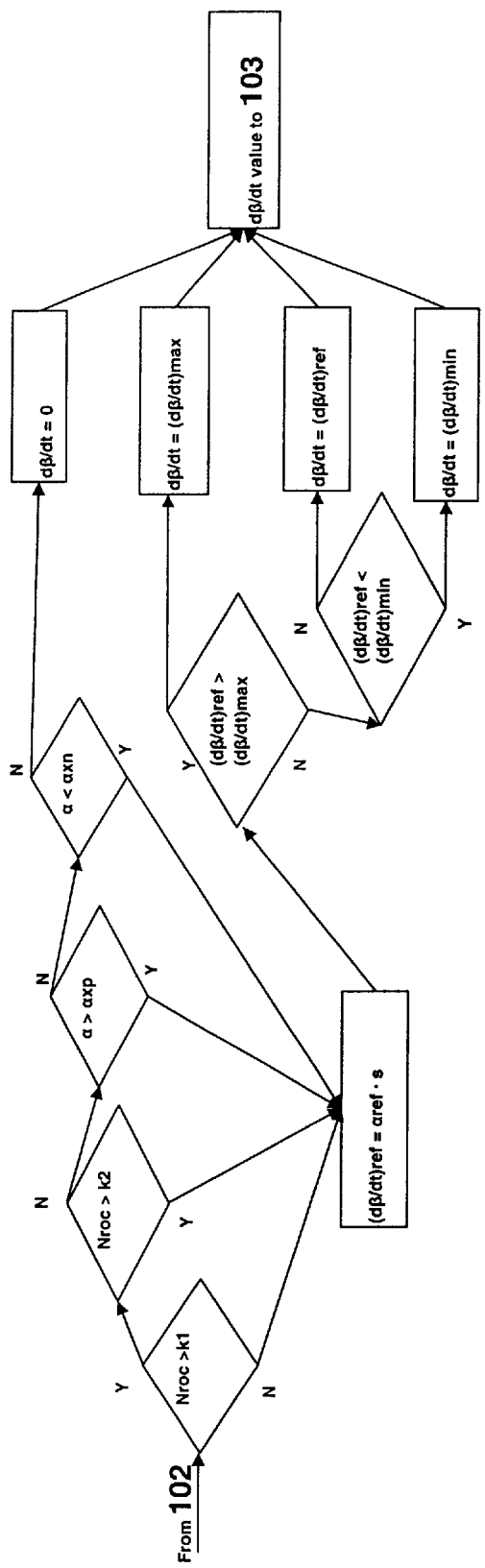
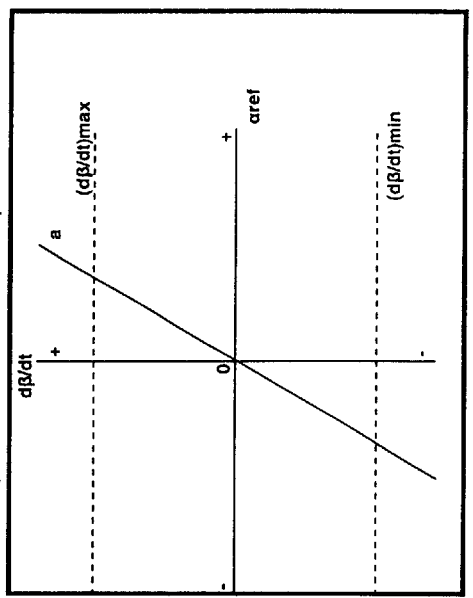
View B  Graphic Illustration of relation of dβ/dt and αref
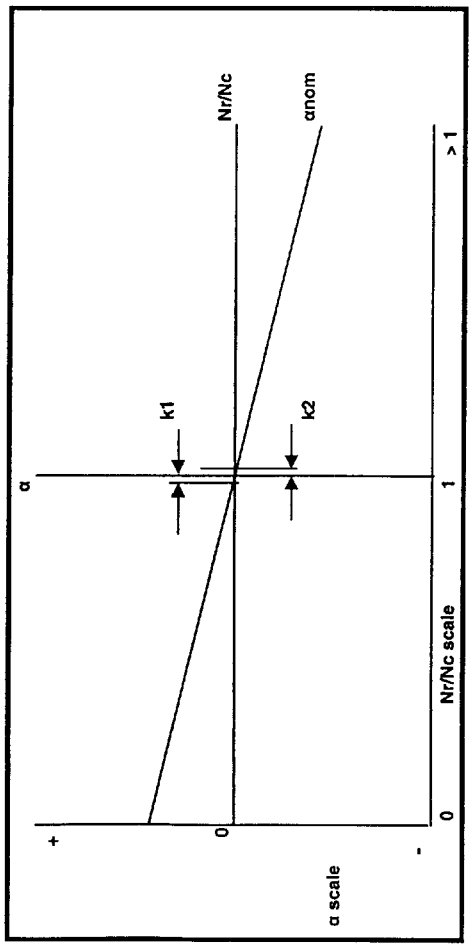
View A  Graphic Illustration of relation of α and Nr/Nc

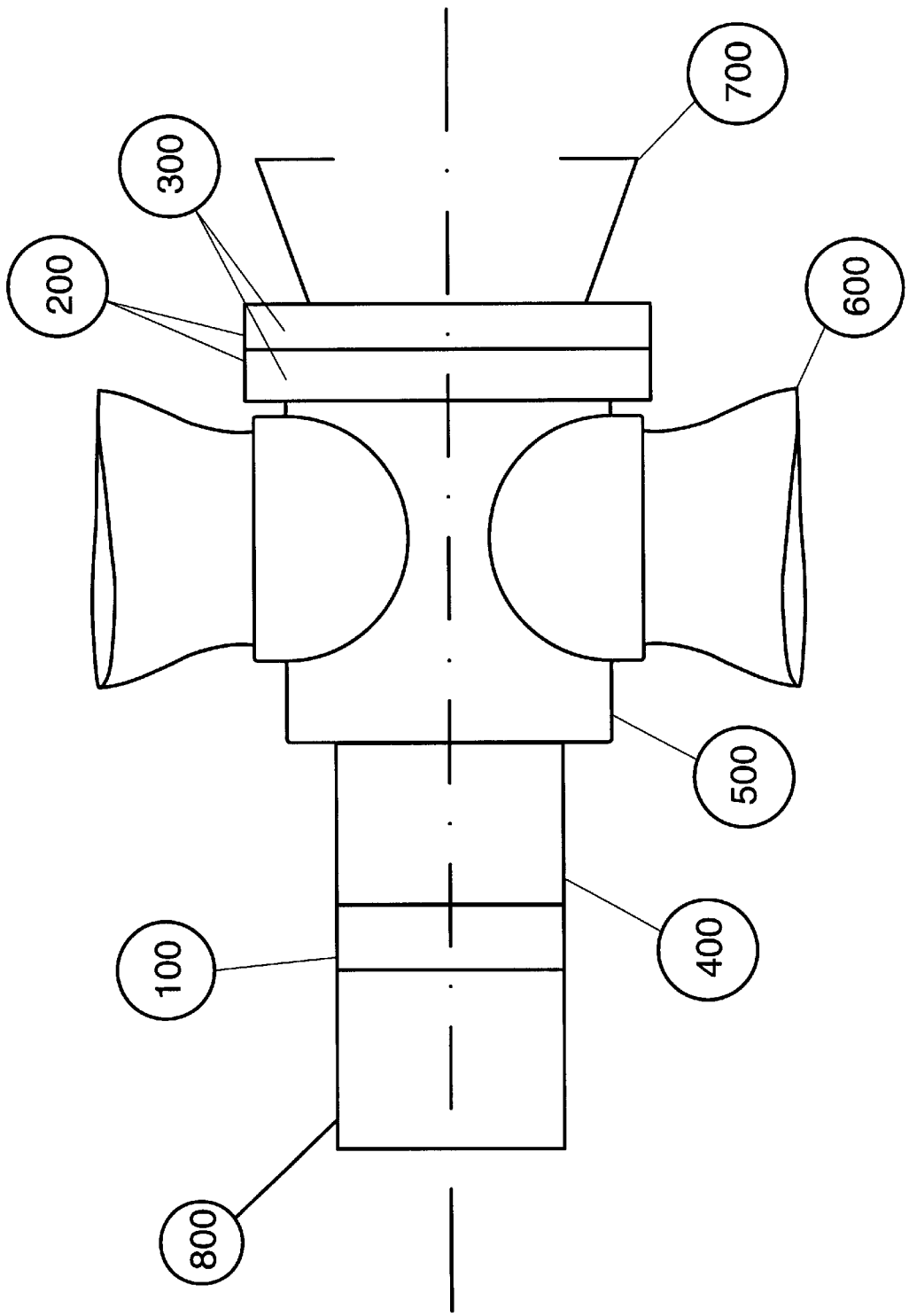
FIGURE 8    BASIC COMPONENTS
Simple Variable Pitch or Constant Speed Propeller with Feathering and/or Reverse Capability

CONSTANT SPEED OR VARIABLE PITCH PROPELLER

WITH FEATHERING AND/OR REVERSE PITCH CAPABILITY

SCHEMATIC ILLUSTRATION

COMMAND MODULE OPERATION OF A VARIABLE PITCH PROPELLER WITH PROVISION FOR FEATHER AND REVERSE

BLADE CONTROL MODULE 100 LOGIC FLOW CHART FOR A VARIABLE PITCH PROPELLER INCLUDING FEATHER AND REVERSE PITCH CAPABILITY

CONTROL LAWS 104 FOR A VARIABLE PITCH PROPELLER WITH FEATHER AND REVERSE PITCH CAPABILITY

See Figure 6a for View A  Graphic illustration of relation of dβ/dt and βc/β

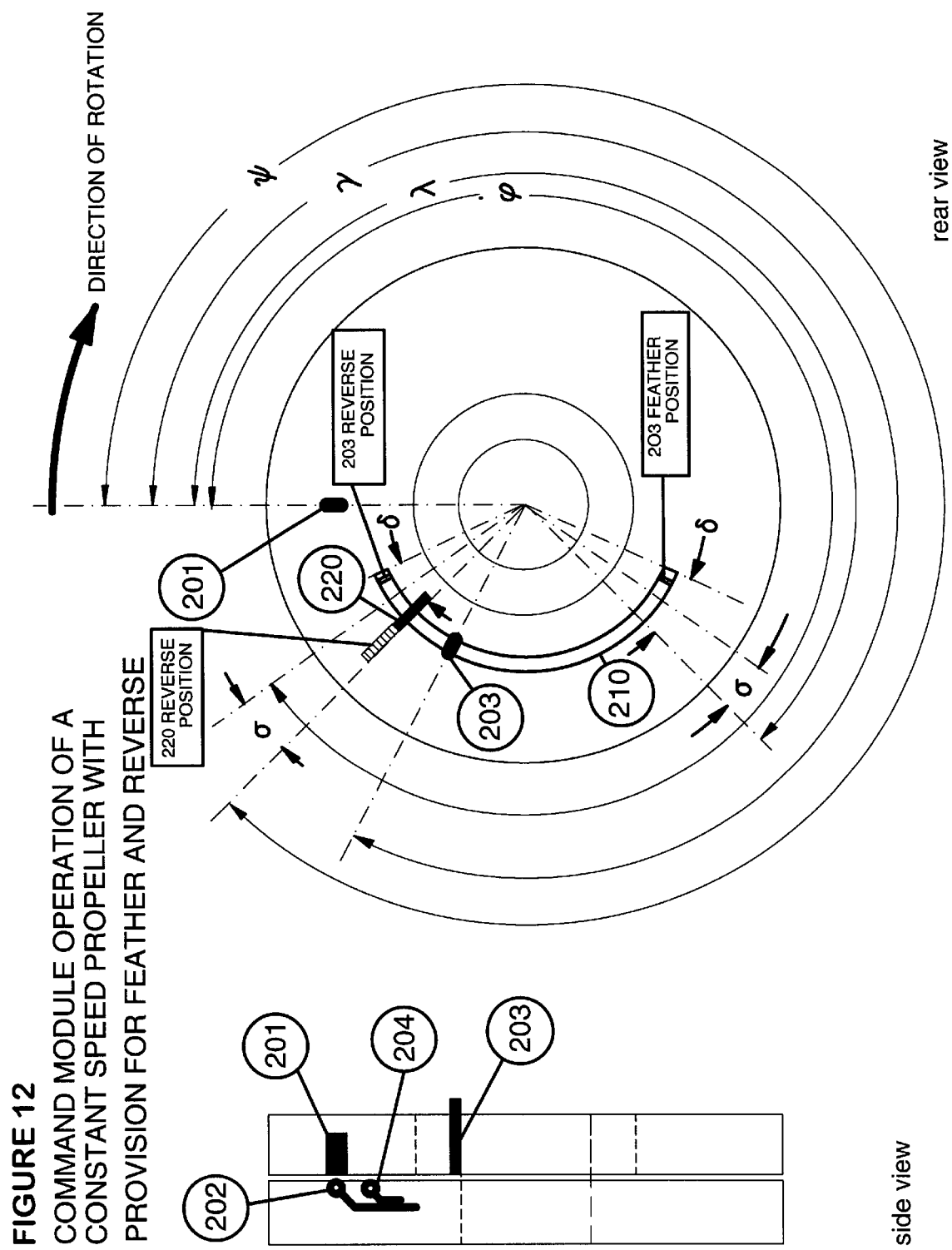
FIGURE 12 COMMAND MODULE OPERATION OF A CONSTANT SPEED PROPELLER WITH PROVISION FOR FEATHER AND REVERSE BLADE CONTROL MODULE 100 LOGIC FLOW CHART FOR A CONSTANT SPEED PROPELLER
INCLUDING FEATHER AND REVERSE PITCH CAPABILITY

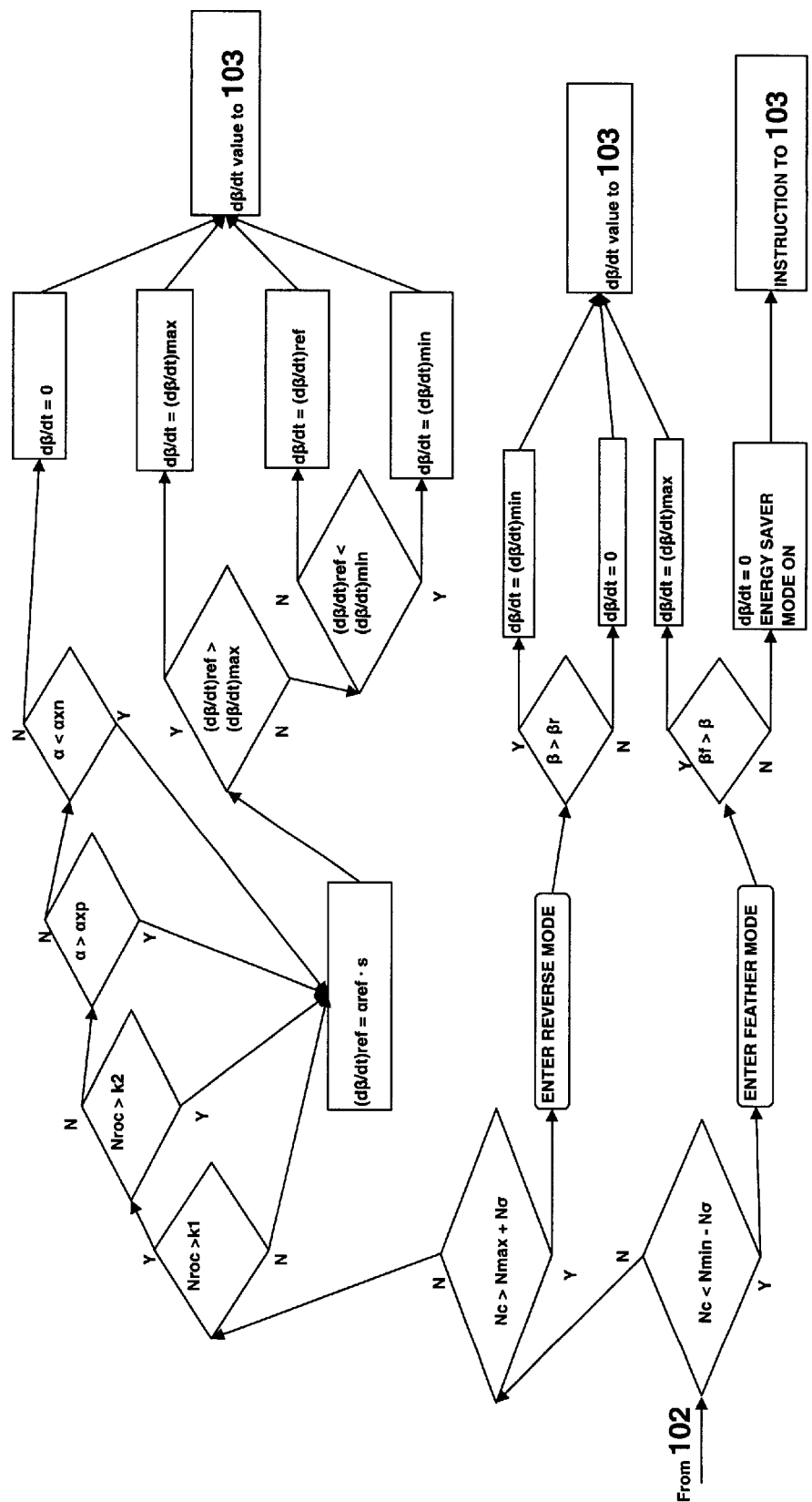

ADDITION OF CONDITION MONITORING TO A CONSTANT SPEED OR VARIABLE PITCH PROPELLER

SCHEMATIC ILLUSTRATION

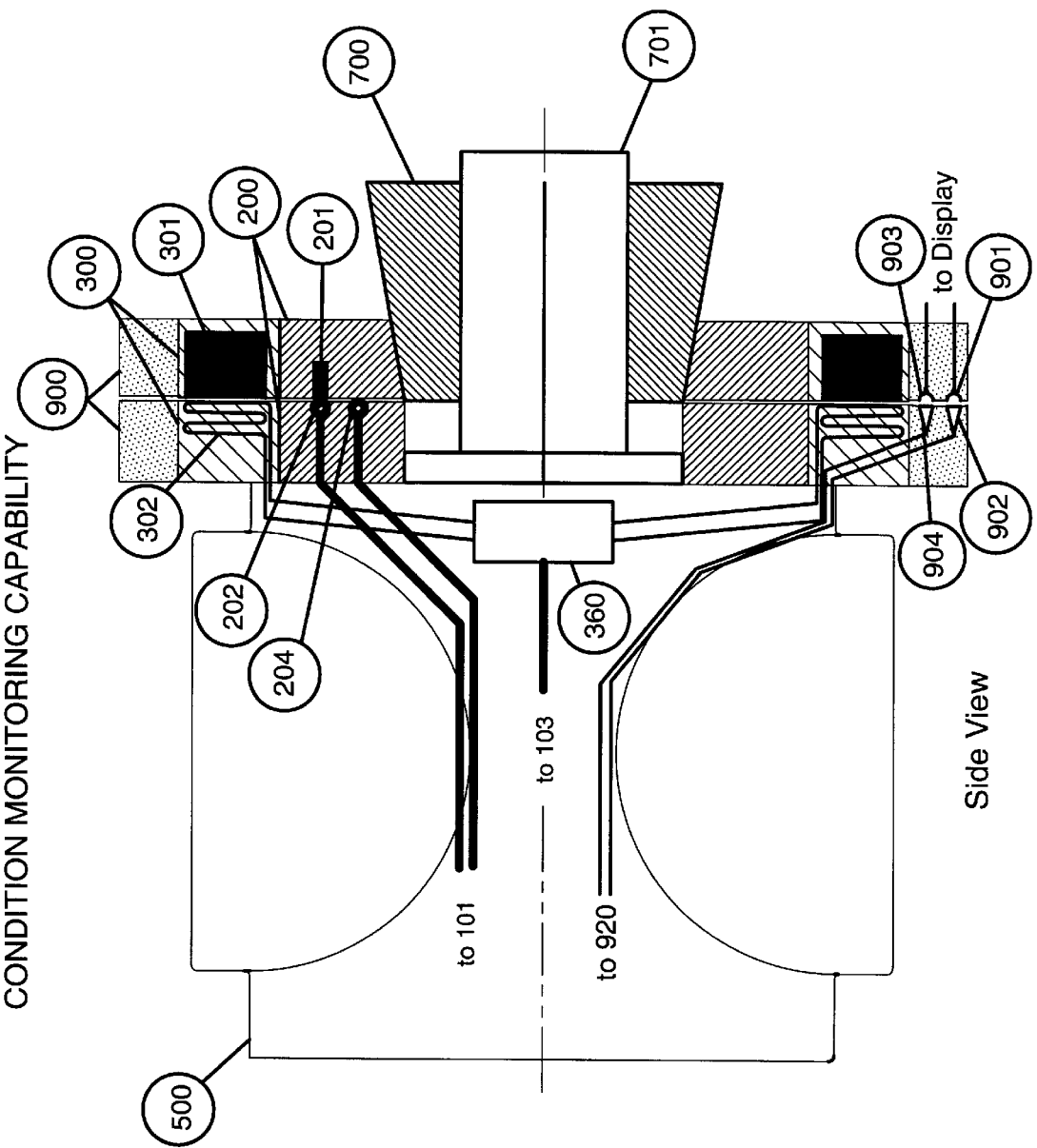
FIGURE 15  SECTIONAL VIEW SHOWING THE ADDITION OF PROPELLER CONDITION MONITORING CAPABILITY

METHOD AND APPARATUS FOR SELF-CONTAINED VARIABLE PITCH AND/OR CONSTANT SPEED PROPELLER INCLUDING PROVISIONS FOR FEATHERING AND REVERSE PITCH OPERATION

TECHNICAL FIELD

The present invention relates generally to the control and governing of aircraft propeller blade pitch, and more specifically, to a method and apparatus for a self-contained variable pitch and/or constant speed propeller including provisions for feathering and reverse pitch operation. The invention is further applicable to marine propellers, windmills, and axial impellers for ventilation and other air handling applications such as wind tunnels. Briefly, the present invention provides a method and apparatus contained within an aircraft propeller that enables adjustment of the propeller blade pitch setting to a selected angle, or the maintenance of a selected rotational velocity via adjustment of blade pitch.

BACKGROUND OF THE INVENTION

The advantages of an in flight controllable pitch propeller have been well known since early twentieth century. As such, there have been many systems developed for controlling aircraft propeller blade pitch. Most such systems have in common at least the following three requirements: (1) the current operating conditions of the propeller must be known to the system—for a controllable pitch system, this would be the current blade pitch setting, whereas for a constant speed system utilizing a governor, this would be the current angular velocity and the angular acceleration, or some function thereof; (2) the desired propeller operating conditions must be known—this would be the selected blade pitch setting for a variable pitch unit, or the selected angular velocity for a constant speed unit; and (3) some form of power must be available to operate the blade pitch change mechanism.

One of the most successful propeller blade pitch changing systems has been the hydraulic system, originally developed by Hamilton Standard, wherein the hydraulic system routes oil pressure from the aircraft engine, or gearbox, through the propeller shaft to provide a means for changing blade pitch. The oil pressure in the propeller shaft is controlled by a governor, which in turn, adjusts the blade pitch to maintain a selected engine rotation speed.

Other methods and systems include various electric systems, wherein electrical power to control the blade pitch is sourced from the aircraft electrical system and transferred to the propeller by means of slip rings or brushes. Mechanical systems for controlling blade pitch have also been utilized, wherein a bearing ring is utilized to transfer motion from a device mounted on the airframe to the propeller for blade pitch changing purposes.

All of the previous systems, however, share the same disadvantage; they problematically depend upon having to transfer the requisite power for blade pitch change from a fixed portion of the engine, or airframe, to the rotating propeller, thus making propeller installation significantly more complex. Specifically, the hydraulic system requires an oil passage through the propeller shaft to the propeller and associated blades, wherein the oil pressure within the propeller shaft must be regulated, and in some cases boosted, by a governor attached to the engine or gearbox. Typically, the governor requires its own set of oil passages, as well as the appropriate mounting pad and drive, thus further complicating, propeller installation. Additionally, hydraulic systems must be effectively sealed to prevent loss of propeller control or even worse, loss of engine or gearbox oil, and therefore, require frequent maintenance for preservation of the system.

With regard to electrical systems, the slip rings or brushes utilized for transferring power to the propeller require frequent replacement and adjustment, are generally unduly expensive, and therefore increase overall maintenance costs. Furthermore, for systems integrity and operational capacity, such electrical systems must be well shielded from electrostatic and/or electrical environmental implements, such as lightning, and/or from other sources of electrical disturbance.

Although relatively structurally simple, mechanical systems are often difficult to implement without incurring significant weight and maintenance problems. In particular, the operational nature of the rotating-to-fixed bearing assembly, utilized for transferring mechanical motion from the engine or airframe to the propeller, generally calls for frequent maintenance, and therefore overrides any benefit otherwise derived from the simplistic installation and design of such a system.

Essentially, in addition to the aforementioned deficiencies, disadvantages and impracticalities, the above-discussed blade pitch changing systems suffer, in general, from added complexity, maintenance requirements, and safety of flight issues, as functional operation of each system burdensomely requires that the blade pitch setting information and the requisite power to change such blade pitch be transferred hydraulically, electrically or mechanically from the fixed engine or airframe to the rotating propeller, thus overly complicating propeller installation.

Therefore, it is readily apparent that there is a need for a self-contained variable pitch and/or constant speed propeller that requires no direct contact of any type, hydraulic, pneumatic, electrical, or mechanical, between the fixed engine or airframe and the rotating propeller, thus facilitating propeller installation and reducing overall system maintenance.

BRIEF SUMMARY OF THE INVENTION

Briefly described, in a preferred embodiment, the present invention overcomes the above-mentioned disadvantages and meets the recognized need for such a device by providing, a method and apparatus for a self-contained variable, pitch and/or constant speed propeller including provisions for feathering and reverse pitch operation, wherein no direct contact is required between the fixed engine or airframe and the rotating propeller for effectuation of blade pitch change, therefore eliminating the burdens and complexities generally associated with propeller installation, maintenance and blade pitch change operations.

According to its major aspects and broadly stated, the present invention in its preferred form is a method and apparatus for a self-contained variable pitch and/or constant speed propeller including provisions for feathering and reverse pitch operation, having, in general, a blade control module, command module, power module, and pitch changer, functioning in association with a propeller hub, propeller blades and propeller shaft housing.

More specifically, in the preferred form, power is supplied by a simple permanent magnet alternator arranged such that the magnets are attached to the fixed portion of the engine, gearbox, or airframe and the coils are attached to the propeller hub. The power available from the alternator can be varied by the number and radial location of the coils and magnets utilized. The necessary power for a specific propeller must be sufficient to change the blade pitch at the maximum required rate when operating at a relatively low angular velocity. The required power available from the alternator will be a function of the specific propeller design. The current flow induced in the coils by the rotation of the propeller goes to a conventional power control module in the propeller hub which provides controlled voltage D.C. power available to operate the system. The pitch setting information is supplied by two non-contact position sensors arranged as follows: (1) the detector halves of the sensors are attached to the rotatable propeller hub along a single radial or azimuth, wherein the other portions of the sensors are attached to the fixed airframe or engine; and wherein (2) one of the sensor halves on the fixed airframe or engine serves as the reference sensor, and is not adjustable. The other sensor half on the fixed airframe or engine is adjustable azimuthally and serves as the command sensor.

The signals from the sensors go to the blade control module, an integrated circuit device with simple computing and timing capability.

The output from the sensors is used to determine the current angular velocity, angular acceleration, and the position of the adjustable sensor relative to the reference sensor. The time for each revolution is measured using the reference sensor signals. The mean angular velocity for each revolution is simply the inverse of the time interval—if the time is measured in seconds, then the angular velocity is in revolutions per second. The angular acceleration is determined by obtaining the difference in angular velocity of successive revolutions and dividing it by the difference in time of the same successive revolutions. The position of the command sensor is determined by the ratio of the time from the beginning of a revolution to passage of the command sensor to the time for the complete revolution. When the angular velocity is constant, this ratio gives the position exactly. When an angular acceleration is present, a correction to the measured position is required to eliminate substantial errors in the calculated position. One method of correction is to correct the time measured from the beginning of the revolution to command sensor passage for the acceleration. Using the time between adjustable sensor passages, the mean angular velocity of the command sensor is determined. A simple algebraic function using the ratio of the command sensor angular velocity to the reference sensor angular velocity is then employed to correct the measured time between reference and command sensor passage for angular acceleration. The ratio of this corrected time to the time for the revolution is then used to determine the adjustable sensor position. This reduces the error in adjustable sensor position determination to well under one percent, except for cases where the angular acceleration is very large and the angular velocity is very small, such as when the engine is starting or is just stopping. Exact knowledge of the command sensor position is not necessary at those conditions.

An alternative method of determining the angular velocity and acceleration is readily available from the alternator. The frequency of the A.C. alternator output may be analyzed to determine angular velocity, wherein the change of frequency with time can provide the angular acceleration. There may be some applications where this approach would be advantageous. Since both the reference and command non-contact sensors are still required, this approach adds a layer of complexity, and for that reason is only an alternative method.

The selected propeller operating condition is determined as a function of the command sensor position. Since the command sensor position is a direct function of the ratio of acceleration corrected time for command sensor passage to time for the current revolution, it is convenient to use this ratio in lieu of the actual angular position of the command sensor relative to the reference sensor. In its simplest and preferred form, the function is merely an appropriate constant determined by the placement and motion range of the command sensor, multiplied by the aforementioned time ratio. The result of that multiplication can be the selected pitch angle for variable pitch operation, or the selected angular velocity for constant speed operation.

The blade control module performs the necessary calculations as described above and uses several logical tests to determine the output to the pitch changer. The logical tests will be different depending upon whether the operation is variable pitch or constant speed. For variable pitch operation, the pitch changer is driven to position the blades at the selected pitch angle. Both constant speed and variable pitch operation require a feedback sensor using the position of the pitch changer or the pitch change mechanism to define the current pitch angle of the blade. Constant speed operation is slightly more complex in that the pitch changer must be operated in a manner that achieves the selected angular velocity with a minimum of hunting, overshoot, and undershoot. The basic logic for constant speed operation pitch change is quite simple; if the measured angular velocity is less than the selected velocity, blade pitch is decreased, if greater, blade pitch is increased. Since the exact blade pitch setting for the selected angular velocity is never known and constantly varies as the aircraft maneuvers, the blade control module contains logic which uses the current and selected angular velocities and the angular acceleration to adjust the blade pitch in a manner that will minimize hunting, overshoot, and undershoot. A preferred form of the logic utilizes a nominal angular acceleration based on the difference between the current angular velocity and the selected angular velocity. For example, when angular velocity is less than the selected angular velocity and the angular acceleration is positive, the blade pitch would be increased if the angular acceleration is greater than nominal, or would remain the same if the angular acceleration was nominal, or would be decreased if the angular acceleration was less than nominal. A reference angular acceleration, defined as the difference between actual and nominal angular accelerations, is utilized to define the pitch change rate.

The blade control module output controls the direction and rate of motion of the pitch changer. The term "pitch changer" as used herein refers to a device that provides the force and motion to the pitch change mechanism to change the blade pitch. There are many types of pitch changers that may be utilized, ranging from electrical stepper motors, electrical linear actuators, to electro hydraulic units and electro pneumatic units. The type used will depend on the system being designed and will be influenced by the type of pitch change mechanism selected for the individual propeller design. Whatever type is utilized, however, it must meet the following requirements: (1) it must be electrically driven; (2) it must be reversible; (3) the rate at which it operates must be variable; and, (4) it must be sufficiently powerful to produce the maximum pitch change rate required for the specific propeller. In a preferred embodiment, the pitch changer would be a variable speed reversible electric motor, and the pitch change mechanism would be a beveled gear turned by the pitch changer and engaging beveled gears on the propeller blade roots to rotate the blades and, accordingly, change the blade pitch.

The present invention is suitable for many applications. Specifically, some airplanes require additional capability. Multi-engine airplanes and powered sailplanes, for example, require propellers that can be feathered if an engine is shut down. Some airplanes further require reverse thrust capability which requires reverse pitch settings. As such, feathering capability is obtained by the following additions to the basic system for constant speed or variable pitch operation: (1) a blade pitch position sensor that can be utilized to determine that the blades are in the feathered position, wherein the blade position is fed back to the blade control module; (2) the feather command is accomplished by a gate protected extended travel capability for the, command sensor (alternatively, an additional non-contact feather sensor that is activated by the selection of the feather condition may be utilized instead), wherein selection of feather can be either by a cockpit command or from the auto feather command in cases where auto-feather is required; (3) the blade control module would possess additional logic to determine the state of the command sensor or the feather sensor, wherein if either sensor is in the feather position, the blade control module activates the pitch changer to move the blades to the feather position; (4) a device for storing energy is required to ensure the completion of the feathering operation and to facilitate unfeathering, wherein the alternator would provide power for moving the blades only when the propeller is rotating, and wherein additional logic would be added to the blade control module to use power from the stored energy source (i.e., an electrical storage battery) when the alternator is not operating or is not producing sufficient power; and, (5) provision for a charging device to use power from the alternator to maintain the energy storage device in a fully charged condition during normal operation.

Unfeathering capability is equally important and in a preferred embodiment would be accomplished in the following manner: (1) the command sensor is placed in the normal operating range, or the feather sensor is deactivated and the starter is engaged to initiate propeller rotation; and, (2) the blade control module then operates in the normal manner and drives the blades to obtain the selected pitch setting or angular velocity using battery power until the output of the alternator is sufficient to operate the propeller.

Reverse thrust capability is obtained by the following additions to the basic system for constant speed or variable pitch operation: (1) a blade pitch position sensor utilized to determine that the blades are in the reverse position or in the minimum pitch position for normal operation, wherein the blade position is fed back to the blade control module; (2) the reverse command is accomplished by a gate protected extended travel capability for the command sensor (alternatively an additional non-contact reverse sensor that is activated by the selection of reverse thrust may be utilized instead); (3) the blade control module would require additional logic to determine the state of the reverse sensor, wherein if the sensor is active, the blade control module activates the pitch changer to drive the blades to the reverse thrust position; and, (4) reverse thrust is obtained by setting the blade pitch to a specified position and modulating the reverse thrust and propeller angular velocity with throttle variation alone. It is also possible to govern the angular velocity by varying the propeller pitch within the available reverse thrust range. When governing is required, additional logic must be added to the blade control module to account for the operational sign change involved in reverse thrust operation.

Changing from reverse thrust operation back to normal operation is accomplished by returning the command sensor to the normal operating range and/or de-activating the reverse sensor. When the reverse sensor is no longer active, the blade control module will first command the pitch changer to move the blades to the normal operation minimum pitch setting and, if angular velocity is governed during reverse operation, cease the reverse governing function. When the minimum pitch setting for normal operation is achieved, the blade control module resumes normal operation. The system for activating reverse thrust must be suitably protected from inadvertent operation while in flight to prevent sensor commands for reverse thrust capability unless the airplane is on the ground.

Preferably, both feather and reverse capability is obtained by use of the gate protected extended travel of the command sensor. The gate protection for the feather operation can be a simple blocking device on the propeller control lever as is commonly utilized. Reverse operation requires a more complex gate, preferably in the form of an electromechanical device attached to the control module for blocking the sensor from the reverse position except when the appropriate ground operations are in progress. Common practice is to use a sensor on the landing gear that blocks reverse operation until there is sufficient weight on the wheels to assure the aircraft is on the ground.

Aircraft propellers specifically, and other applications are, in general good practice, designed so that any single failure of any portion of the system that controls the blade pitch will not result in an unsafe condition or a catastrophic failure. The current invention lends itself to the most fail safe remedies and warning systems.

Specifically, a complete loss of power due to the failure of the alternator or power control module may be remedied by one or more of the following: (1) counterbalanced blades to prevent the propeller blade pitch from moving to an unsafe position when power to the propeller is lost; and/or, (2) inclusion of a battery as a power backup or as required for feathering provides for normal operation to continue until the battery is exhausted, or for the blades to be set to a pre-selected pitch position, and the system shut down.

Complete failure of the blade control module may be remedied by the following: (1) redundant or multiple blade control modules to allow continued operation; and/or; (2) counterbalanced blades to prevent the propeller blade pitch from moving to an unsafe position when power to the propeller is lost.

Warning signals to the pilot or operator may be transmitted through additional non-contact sensors that are active when the system is operating normally.

Icing is always a problem with aircraft propellers as well. The various anti-icing or de-icing systems currently in use have the same problems as current variable pitch and constant speed propellers in that the power or other provisions for icing protection must be transferred from the fixed portion of the airframe or engine to the rotating propeller. The current invention lends itself to self-contained icing protection as a result of its self-contained power generation. Power for icing protection may be obtained by designing the alternator to provide sufficient power to both operate the propeller and provide electrical anti-icing or de-icing. Icing protection may be initiated automatically by the use of appropriate icing sensors or selected by the operator by means of an additional non contact sensor.

Accordingly, a feature and advantage of the present invention is its self-contained power and blade pitch control capability.

Another feature and advantage of the present invention is its ability to operate as a variable pitch propeller without having to directly transfer any form of power from the engine or gearbox to the propeller.

Another feature and advantage of the present invention is its ability to operate as a constant speed propeller without having to directly transfer any form of power from the engine or gearbox to the propeller.

Another feature and advantage of the present invention is its ability to operate as a fully feathering variable pitch propeller without having to directly transfer any form of power from the engine or gearbox to the propeller.

Another feature and advantage of the present invention is its ability to operate as a fully feathering constant speed propeller without having to directly transfer any form of power from the engine or gearbox to the propeller.

Another feature and advantage of the present invention is its ability to operate as a variable pitch propeller with reverse thrust capability without having to directly transfer any form of power from the engine or gearbox to the propeller.

Another feature and advantage of the present invention is its ability to operate as a constant speed propeller with reverse thrust capability without having to directly transfer any form of power from the engine or gearbox to the propeller.

Another feature and advantage of the present invention is its ability to operate as a fully feathering variable pitch propeller with reverse thrust capability without having to directly transfer any form of power from the engine or gearbox to the propeller.

Another feature and advantage of the present invention is its ability to operate as a fully feathering constant speed propeller with reverse thrust capability without having to directly transfer any form of power from the engine or gearbox to the propeller.

Another feature and advantage of the present invention is its applicability to many current propeller designs as well as future propeller design.

Another feature and advantage of the present invention is its wide applicability, as it is highly scalable and may therefore be applied to either very large propellers or very small propellers.

Another feature and advantage of the present invention is its applicability to devices other than aircraft propellers including, but not limited to, ventilation fans, wind machines, windmills, marine propellers, and other axial impellers.

Another feature and advantage of the present invention is its ability to precisely set the blade pitch angle of a variable pitch propeller.

Another feature and advantage of the present invention is its ability to precisely control angular velocity of a constant speed propeller.

Another feature and advantage of the present invention is its ability to control blade pitch or angular velocity via a non-contact sensor positionably adjustable by a simple manually-operated mechanical linkage.

Another feature and advantage of the present invention is its ability to control blade pitch or angular velocity via a non-contact sensor positionably adjustable by a simple automatically-operated mechanical linkage, such as those utilized in single power lever systems.

Another feature and advantage of the present invention is its ability to control blade pitch or angular velocity via a non-contact sensor positionably adjustable by a simple automatically-operated mechanical linkage, such as those utilized in variable flow ventilation systems and constant flow variable load air handling systems.

Another feature and advantage of the present invention is its incorporation of simple non-contact sensors to provide pilot warning of system component failures or inadequate performance.

Another feature and advantage of the present invention is its ability to provide propeller de-icing utilizing the self-contained electrical power generated via the present invention.

These and other objects, features and advantages of the present invention will become more apparent to one skilled in the art from the following description and claims when read in light of the accompanying drawings.

BRIEF DESCRIPTION OF THE DRAWINGS

The present invention will be better understood by reading the Detailed Description of the Preferred and Alternate Embodiments with reference to the accompanying drawing figures, in which like reference numerals denote similar structure and refer to like elements throughout, and in which:

FIG. 2 is a schematic drawing of the present invention indicating the flow of power and information through the components of a simple constant speed or variable pitch propeller.

FIG. 3 is a side view of the present invention with a cutaway illustrating the arrangement of components of the power and command modules of a simple constant speed or feathering propeller.

FIG. 6a is an illustration of control laws used in the blade control module logic for a simple variable pitch propeller.

FIG. 7a is an illustration of control laws used in the blade control module logic for a simple constant speed propeller.

FIG. 8 is a side view indicating the components of the present invention applied to a constant speed or variable pitch propeller with feathering capability and/or reverse pitch capability.

FIG. 12 is a rear and side view of the command module showing the arrangement of the fixed and adjustable non contact sensor components of a constant speed propeller with feathering capability and/or reverse pitch capability.

FIG. 13a is an illustration of control laws used in the blade control module logic for a constant speed propeller with feathering and/or reverse pitch capability.

FIG. 15 is a side view of the present invention with a cutaway illustrating the addition of a propeller condition module to the components illustrated in FIG. 3

DETAILED DESCRIPTION OF THE PREFERRED AND ALTERNATIVE EMBODIMENTS

In describing the preferred and alternate embodiments of the present invention, as illustrated in FIGS. 1–15, specific terminology is employed for the sake of clarity. The invention, however, is not intended to be limited to the specific terminology so selected, and it is to be understood that each specific element includes all technical equivalents that operate in a similar manner to accomplish similar functions.

For purposes of simplicity, the term "propeller" is preferably utilized herein to describe any device utilizing blades to accelerate the flow of a fluid, wherein the blades of such devices may have either free tips or be contained within a duct, as application of the present invention, to such devices is in full contemplation of the applicant's invention as described herein. Additionally, as the present invention is scalable, it is applicable to any size propeller, windmill, impeller, or similar device.

Preferably, the term "variable pitch," as referenced herein, refers to a propeller or other impeller designed such that the blade pitch may be set to various angles by the operator or other external source while the propeller is operating. Additionally, the term "constant speed," as referenced herein, refers to a propeller or other impeller designed such that the blade pitch is adjusted automatically to maintain a constant angular velocity under conditions of changing load on the propeller, or variations in power applied to the propeller shaft.

It should be further noted that the variable pitch propeller may also be used as a constant speed propeller by means of an external governor that varies the blade pitch to maintain a constant angular velocity. Furthermore, in applications, such as ventilation fans or aircraft with multiple cross shafted propellers, it is desirable to vary the airflow or thrust by changing the propeller pitch while maintaining the propeller angular velocity by varying the power.

Figure 1:
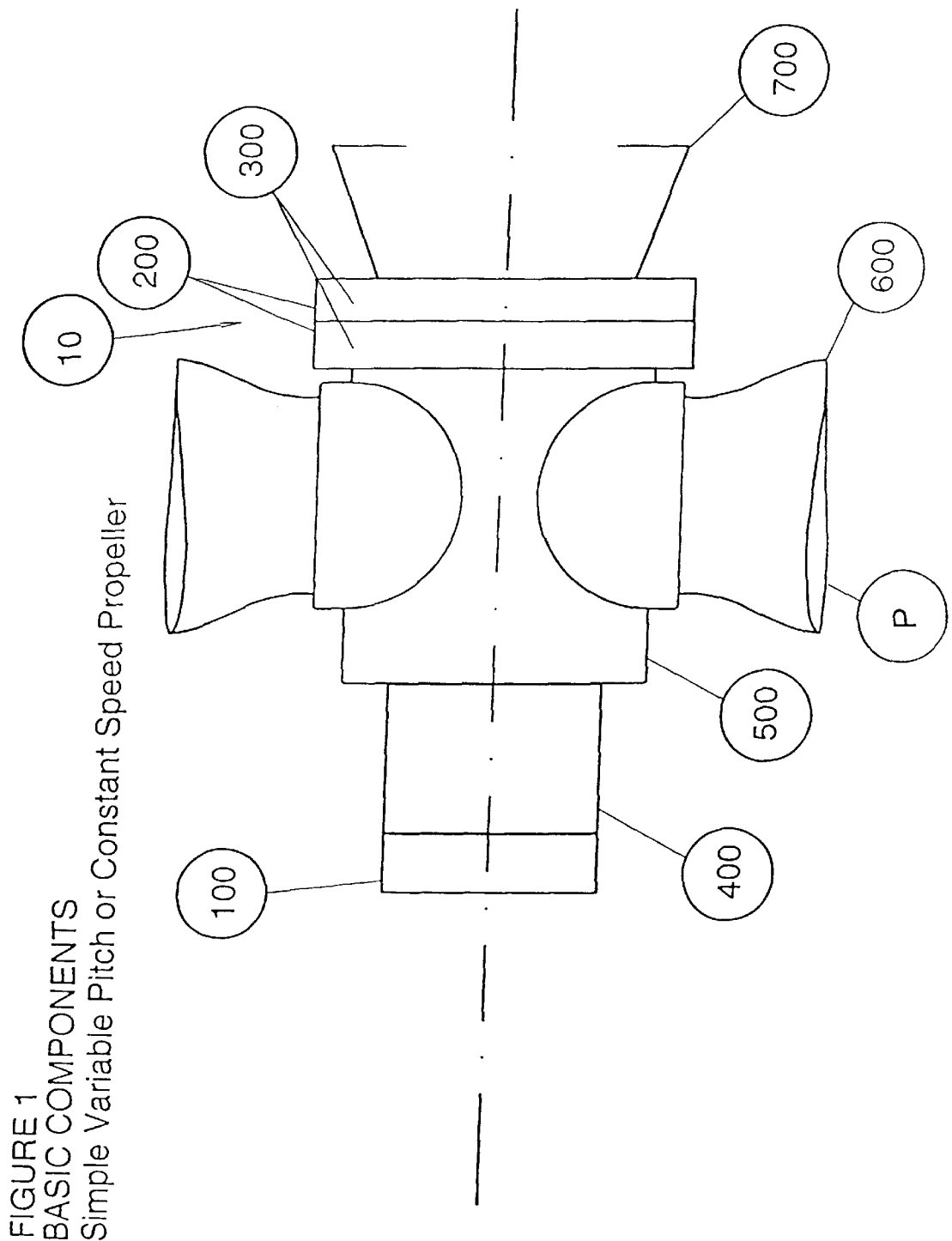
FIG. 1 is a side view indicating the components of the present invention applied to a simple constant speed or variable pitch propeller.

Referring now to FIG. 1, illustrated therein is a conventional aircraft propeller P equipped with apparatus 10 of the present invention, preferably in an arrangement suitable for a simple variable pitch or constant speed propeller, wherein apparatus 10 is preferably a collaboration of components utilized to effectuate a self-contained blade pitch changing system within a variable pitch or constant speed propeller. Preferably, apparatus 10 generally possesses blade control module 100, command module 200, power module 300 and pitch changer 400. Propeller hub 500, propeller blades 600 and propeller shaft housing 700 are preferably conventional or generic depictions common to any variable pitch or constant speed propeller system. It is contemplated within an alternate embodiment that the components of apparatus 10, as illustrated in FIG. 1, do not necessarily depict the precise size, shape or location thereof, as other suitable sizes, shapes and/or locations of the components of device 10 could be utilized without departing from the appreciative scope of the present invention, as such additions and/or modifications are known within the art and in full contemplation of the inventor in describing the present invention herein.

Preferably, command module 200 and power module 300 are located at the interface of the fixed propeller shaft housing 700 and the rotating propeller hub 500, wherein the precise locations of blade control module 100 and pitch changer 400 will depend upon the design of the specific propeller being treated, and as such, are not required to be in the arrangement as shown in FIG. 1. As is contemplated herein, pitch changer 400 may be any reversible variable rate device, such as, for exemplary purposes only, electric motors, electrical stepper motors, electrical linear actuators, electro hydraulic units, or electro pneumatic units, wherein the specific type of reversible variable rate device utilized is dependent upon the design of the specific propeller.

Referring now to FIG. 2, illustrated therein is an operational schematic of a simple variable pitch or constant speed propeller according to a preferred embodiment of the preset invention. Preferably, power module 300 is a simple permanent magnet alternator, wherein permanent magnet section 301 is fixed to propeller shaft housing 700, and the rotating coils 302 attached to propeller hub 500. The variable voltage and frequency a.c. output from coils 302 are preferably conveyed to power control module 360 that provides constant voltage d.c. power to power transfer section 103 of blade control module 100—similar in fashion to that of a standard automotive arrangement. Preferably, power transfer section 103 distributes power as directed by control logic section 102 of blade control module 100, and further preferably provides the requisite power to operate blade control module 100.

Preferably, command module 200 comprises a reference sensor having two portions, the fixed portion 201 attached to propeller shaft housing 700, and rotating detector 202 attached to propeller hub 500, and further comprises a command sensor having two portions, adjustable portion 203 attached to propeller shaft housing 700, and rotating detector 204 attached to propeller hub 500. The output signals from reference sensor detector 202 and command sensor detector 204 are preferably conveyed to timing section 101 of blade control module 100. Timing section 101 preferably contains a common timing base, such as a quartz crystal, and preferably measures the time between each reference sensor 202 signal, tr, and the time from each reference sensor 202 signal and the next command sensor 204 signal tc, as well as the time between command sensor passages tcv. A minimum of two sequential times are retained and the times are preferably utilized to determine the current angular velocity and angular acceleration. Control logic section 102 of blade control module 100 preferably utilizes the angular velocity, angular acceleration, and current tc value to determine the current operating condition and the commanded operating condition. Based upon a logical evaluation of current and commanded conditions and the blade position as feedback from the blade position sensor 401, the requirements for a blade pitch change and the pitch change rate are determined, wherein these requirements are then conveyed to power transfer section 103 application of the appropriate power to pitch changer 400.

Referring now to FIG. 3, illustrated therein is the preferred arrangement of power module, 300 and command module 200 as applied to a simple variable pitch or constant speed propeller.

Preferably, power module 300 possesses fixed permanent magnets 301 attached to propeller shaft housing 700, and rotating coils 302 attached to propeller hub 500. Rotation of propeller shaft 701 preferably causes coils 302 to pass through the fields of magnets 301 and, as such, produce an alternating electrical current that is transferred to power control module 360. Power control module 360 preferably changes the alternator supplied a.c. power to a regulated voltage d.c. power made available to power transfer section 103 of blade control module 100. Permanent magnets 301 and coils 302 are preferably radially arranged around power module 300, wherein the size and number of magnets 301 and coils 302 are preferably defined by the power requirements of the specific propeller design. The diameter of power module 300, and the specific physical characteristics thereof, is also determined by the specific propeller design. Power control module 360 preferably follows conventional practice of converting the a.c. power generated by the alternator to voltage regulated d.c. power available for operating the propeller.

Command module 200 preferably possesses fixed non-contact, reference sensor transmitter 201 and adjustable non-contact command sensor transmitter 203 (not shown in FIG. 3), and further possesses rotating reference sensor detector 202 and rotating command sensor detector 204 attached to propeller hub 500. In a preferred embodiment, both sensor detectors are mounted on the same radial line. There are many types of non-contact sensors that may be used for command module 200, such as, for exemplary purposes only, a simple wire loop detector that has a voltage induced when it passes through the magnetic field of a simple permanent magnet, or highly sophisticated optical devices. The simplest device is preferred, wherein the required accuracy will depend upon the specific application. The signals from reference sensor detector 202 and command sensor detector 204 are routed to timing section 101 of blade control module 100. The operation of the command module 200 is covered in FIG. 4 below.

Figure 3A:
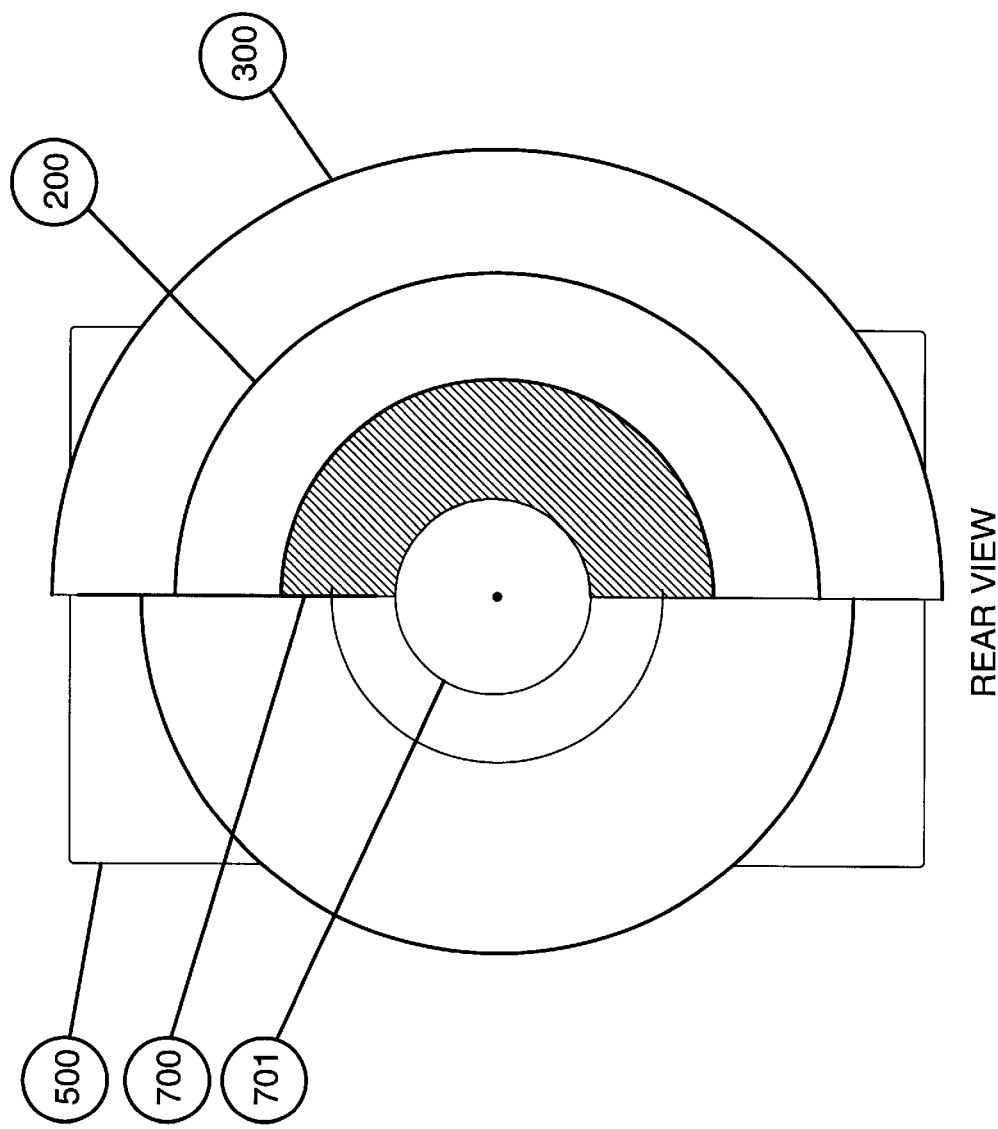
FIG. 3a is a rear view of the present invention illustrating the cutaway of FIG. 3 indicating the arrangement of components of the power and command modules of a simple constant speed or feathering propeller.
Figure 3B:
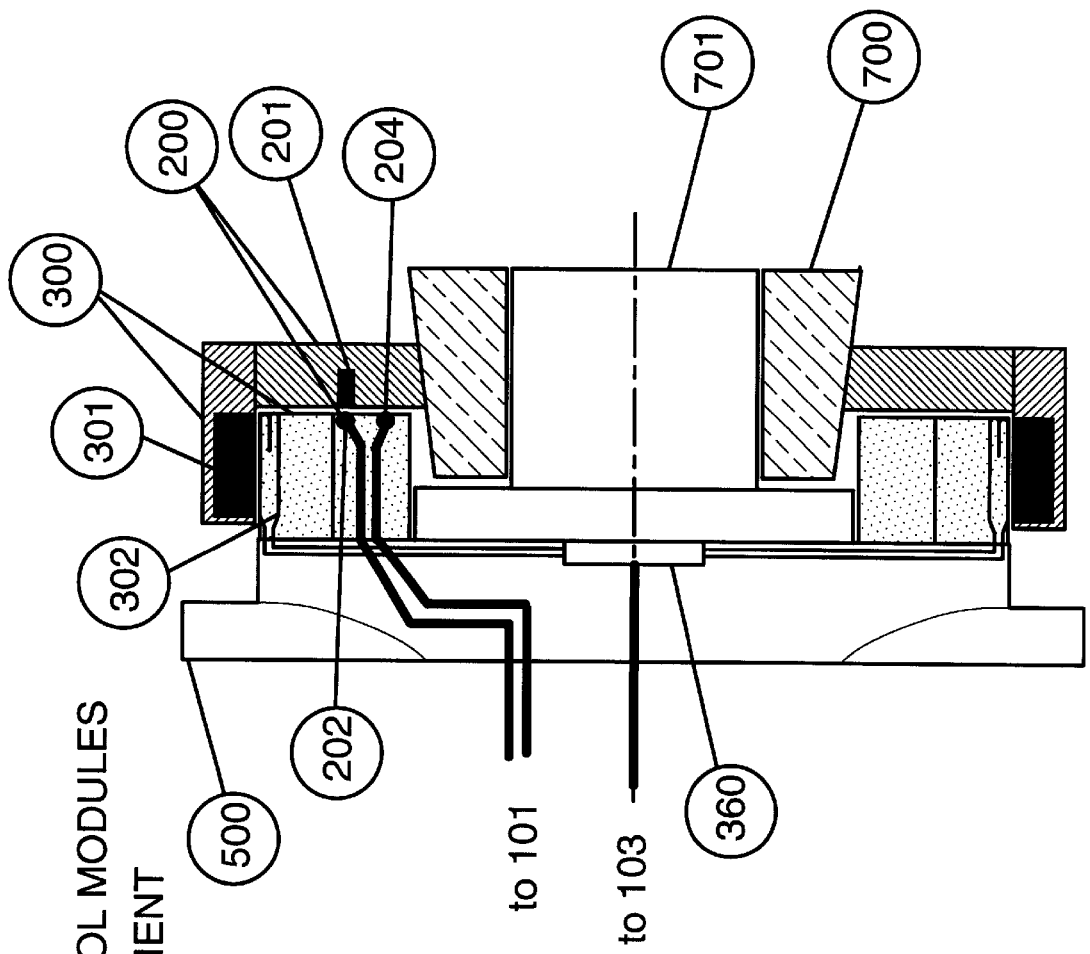
FIG. 3b is a side view of the present invention with a cutaway illustrating an alternate arrangement of components of the power and command modules of a simple constant speed or feathering propeller.
Figure 3C:
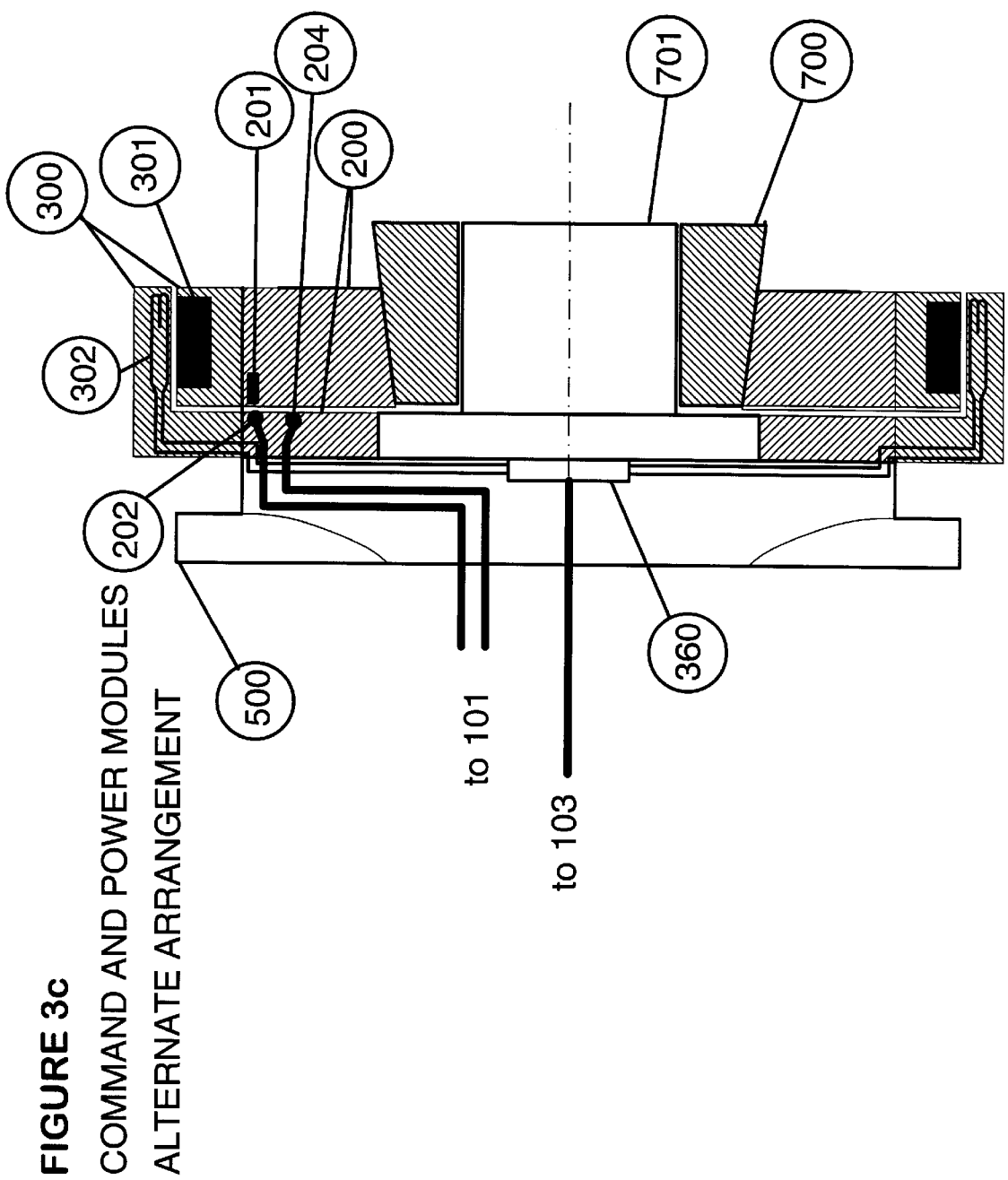
FIG. 3c is a side view of the present invention with a cutaway illustrating an alternate arrangement of components of the power and command modules of a simple constant speed or feathering propeller.
Figure 3D:
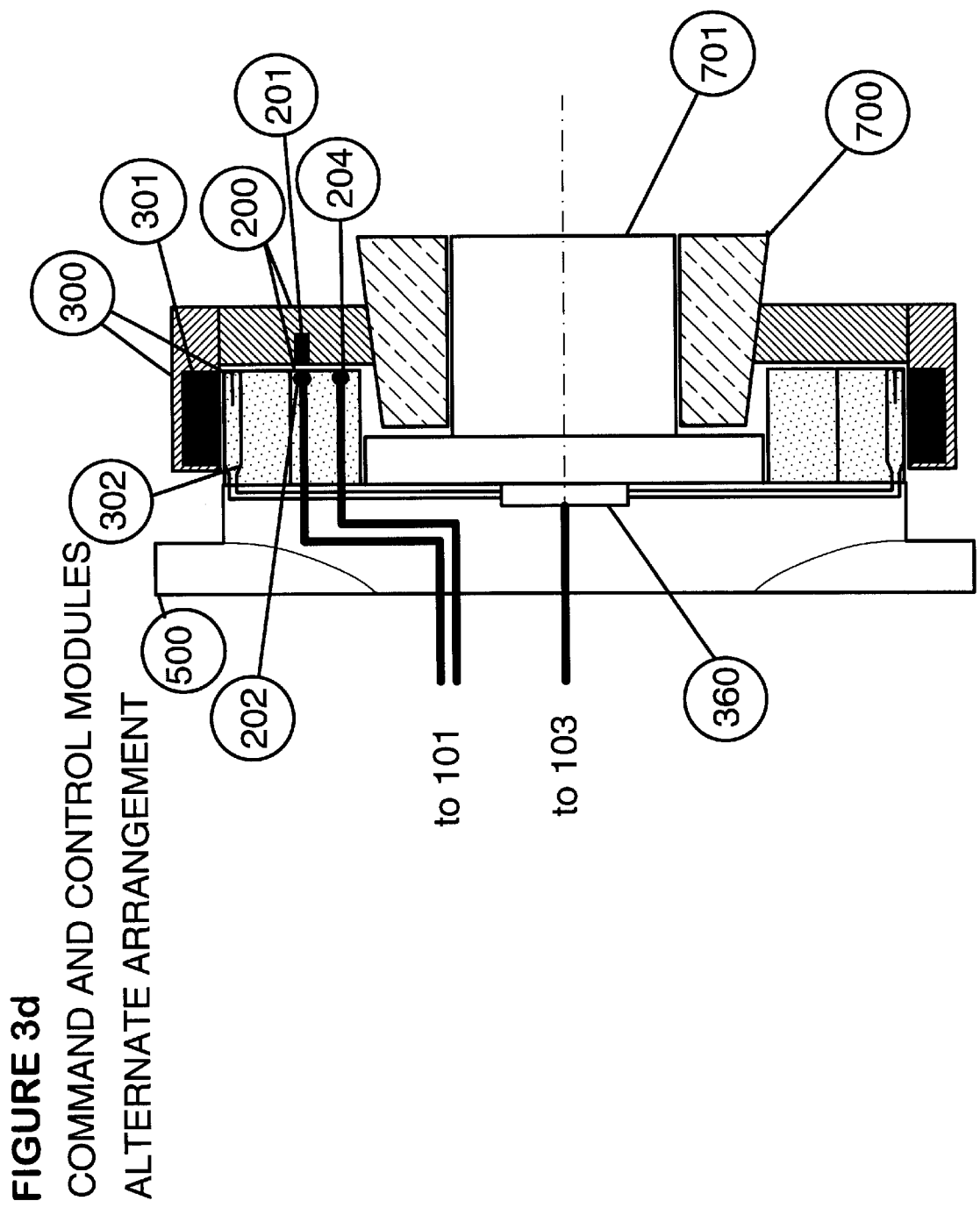
FIG. 3d is a side view of the present invention with a cutaway illustrating an alternate arrangement of components of the power and command modules of a simple constant speed or feathering propeller.
Figure 3E:
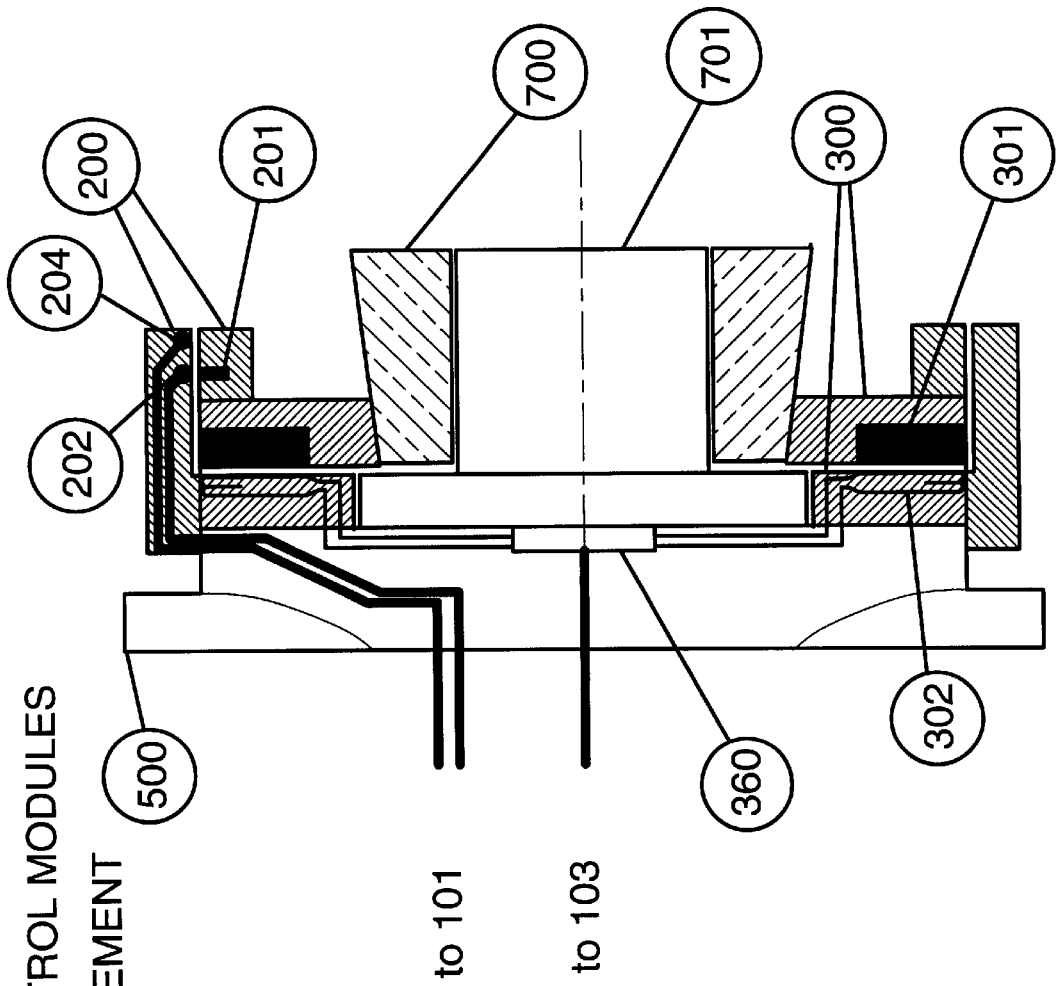
FIG. 3e is a side view of the present invention with a cutaway illustrating an alternate arrangement of components of the power and command modules of a simple constant speed or feathering propeller.

Referring now to FIG. 3a, illustrated therein is a rear view of the cutaway or removed section as illustrated in FIG. 3. The purpose of this illustration is to clarify FIG. 3. Referring now to FIGS. 3b, 3c, 3d, 3e, illustrated therein are alternate embodiments of command module 200 and power module 300, wherein the present alternate embodiments are but a few of many alternate embodiments of command module 200 and power module 300 that may be utilized without departing from the appreciative scope of the present invention, as such alterations and modifications are in full contemplation of the applicant's invention as described herein. Any arrangement of command module 200 and power module 300 may be utilized so long as the following criteria are met: (1) the portion of command module 200 containing reference sensor detector 202 and command sensor detector 204 is fixed to propeller hub 500 and/or shaft 700 and rotates with the propeller; (2) reference sensor detector 202 and command sensor detector 204 are aligned on the same radial or azimuth from the axis of rotation; (3) the portion of power module 300 containing alternator coils 302 is fixed to propeller hub 500 and/or shaft 700 and rotates with the propeller; (4) the portion of command module 200 containing reference sensor transmitter 201 and command sensor transmitter 203 is fixed to propeller shaft housing 700 and does not rotate therewith; (5) reference sensor transmitter 201 is fixed to the non-rotating portion of command module 200; (6) command sensor transmitter 203 is azimuthally adjustable along a constant radius from the center of rotation; (7) the portion of power module 300 containing alternator magnets 301 is fixed to propeller shaft housing 700 and does not rotate therewith; (8) the non-contact sensors utilized should be capable of functioning at the maximum air gap expected for the specific design allowing for manufacturing tolerances, installation tolerances, free play in the shaft, and vibration during operation; and, (9) alternator coils 302 and magnets 301 utilized should be capable of providing the required power at the design conditions at the maximum air gap expected for the specific design, allowing for manufacturing tolerances, installation tolerances, free play in the shaft, and vibration during operation. It should be recognized that the alternate embodiments of FIGS. 3–3e are not intended to be limited to a specific shape, size, position of component, material, or other characteristic required for the manufacture of a specific propeller design. It should also be noted that command module 200 and power module 300 are illustrated as separate components solely for clarity of explanation. In actual practice, it is acceptable to have the portions of both the power and command modules that are fixed to the propeller shaft housing 700 contained within a single component. The rotating portions of the power and command modules attached to the propeller hub or shaft may also be combined in a single component or even be integrated into the propeller hub.

Figure 4:
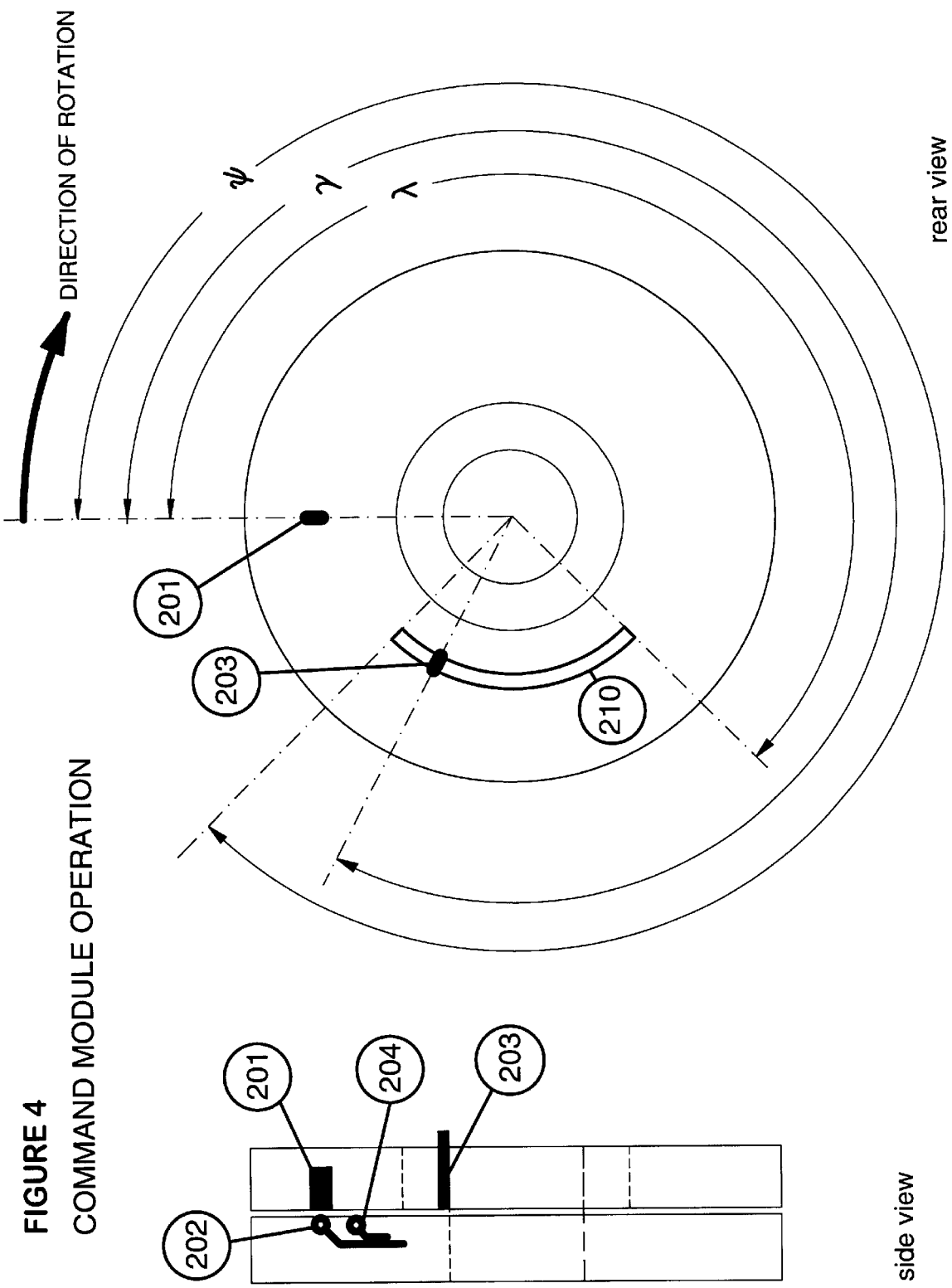
FIG. 4 is a side and rear view of the command module showing the arrangement of the fixed and adjustable non contact sensor components of a simple constant speed or variable pitch propeller.

Referring now to FIG. 4, illustrated therein is a preferred embodiment of command module 200 for a simple variable pitch or constant speed propeller. The selected propeller operating condition is a direct function of the azimuthal relation of command sensor transmitter 203 to reference sensor transmitter 201, designated as the angle γ. The angles ψ and λ represent the limits of command sensor transmitter 203 adjustment relative to reference sensor transmitter 201. The position of command sensor transmitter 203 sets the operating condition of the propeller. The sector 210 illustrates the total available travel of command sensor transmitter 203. The solution for the selected operating condition of the propeller requires the determination of the angle γ; in a preferred embodiment this is accomplished in blade control module 100. The angles shown in FIG. 4 are illustrative only, wherein the limits expressed in radians are as follows; ψ must be less than 2π and greater than λ, λ must be greater than 0, and γ may be any value between λ and ψ. Considering now a propeller operating at a constant angular velocity ω, and defining the time for one complete revolution of the propeller as tr and the time from reference sensor detector 202 passage of reference sensor transmitter 201 to command sensor detector 204 passage of command sensor transmitter 203 as tc, it is readily seen that the angle γ is equal to 2π(tc/tr), with the angle expressed in radians. If the angular velocity is not constant the previous equation does not hold. However, there is a simple correction to tc that provides an accurate solution for λ, wherein the corrected time is defined as tcc. The diagram of FIG. 4 is schematic in nature and is not to be construed as a specific design. The relations described above apply to all the arrangements of command module 200 and power module 300 illustrated in FIGS. 3–3e. The mechanism for adjusting the command sensor transmitter 203 is not illustrated, as there are many mechanical designs of said mechanism that meet the following requirements: (1) ability to maintain command sensor transmitter 203 at a constant radius from the center of rotation; (2) ability to hold command sensor transmitter 203 at a precise angular position relative to reference sensor transmitter 201; (3) possess a minimum of backlash and are resistant to the vibratory environment of the engine and propeller; and, (4) can be readily connected to actuation systems that may range from mechanical links to the pilots controls to an actuator controlled by other automatic systems. The mechanism utilized is preferably dependent upon the specific application and its specific requirements for angular motion and sensor location.

Figure 5:
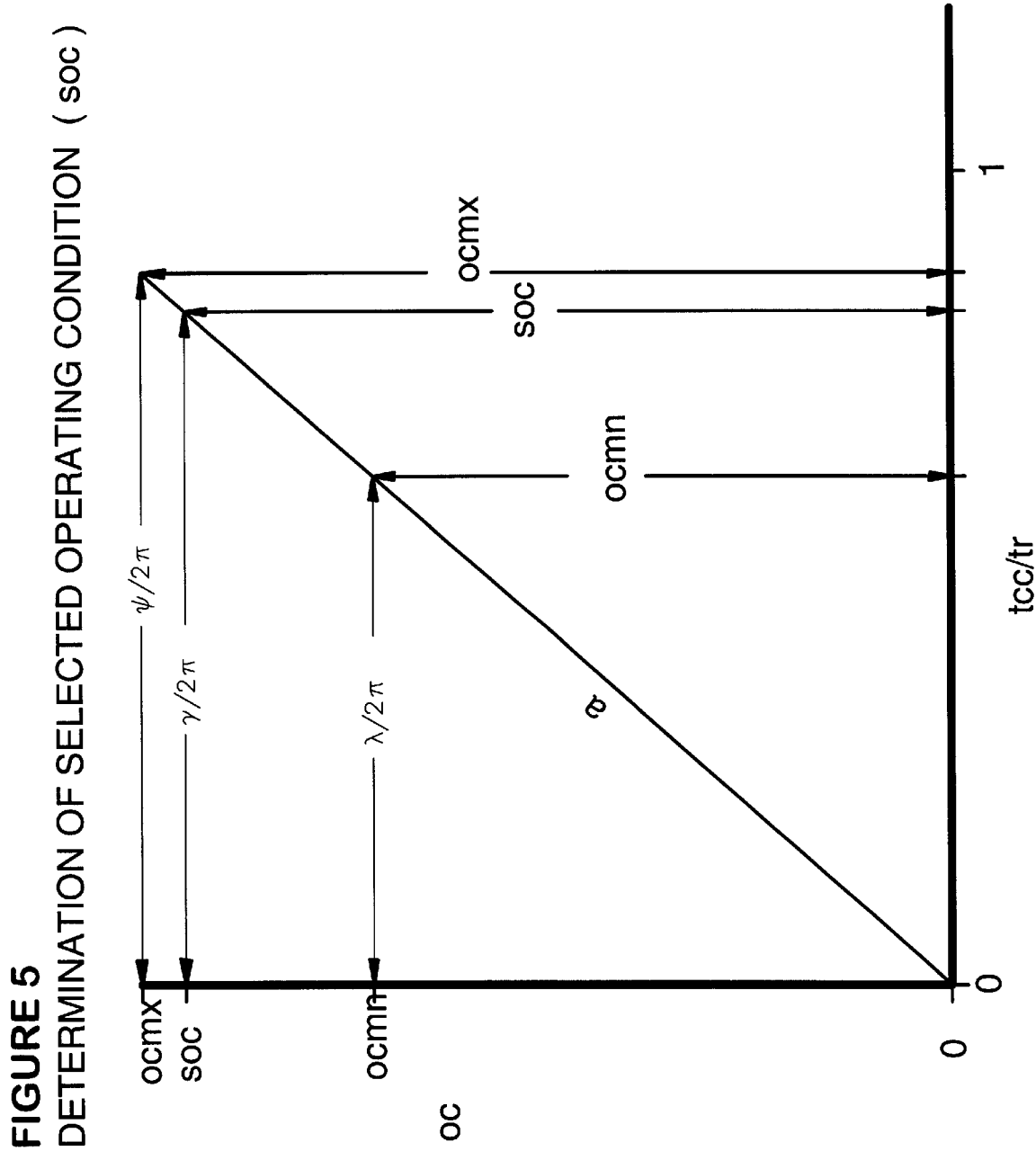
FIG. 5 is a chart showing the time relations of the non contact sensor outputs used to determine the current and commanded operating conditions for a simple variable pitch or constant speed propeller.

Referring now to FIG. 5, illustrated therein is a chart showing the relation between the ratio tcc/tr, the angles ψ, γ, and λ, as shown in FIG. 4, and the selected operating condition (hereinafter referred to as "soc") of the propeller. In a preferred embodiment, the slope of the line a (hereinafter referred to as "sla") is simply the maximum operating condition (hereinafter referred to as "ocmx") divided by the expression (ψ/2π), where ψ is expressed in radians. The angular position of command sensor transmitter 203 expressed as a fraction of a circle, is simply (γ/2π), and as may be seen in FIG. 5, the angular position so expressed is also equal to a specific value of (tcc/tr) so that the soc is preferably expressed as (tcc/tr)·(sla). The soc will be the angular velocity, "n", selected for current operation for a simple constant speed propeller or the propeller blade pitch angle, β$_p$, for a simple variable pitch propeller. The value of (tcc/tr) preferably cannot exceed 1 or be less than 0, wherein the values λ/2π, γ/2π, and ψ/2π illustrated in FIG. 5 correspond to the minimum, selected, and maximum values, respectively, of the operating condition illustrated in FIG. 4. The limit values of the operating conditions and the range of adjustment are chosen for the specific application and are not restricted to those illustrated herein. The limits may be set by mechanical stops in command sensor transmitter 203 adjustment mechanism, or be included in blade control module 100 logic or both. The only restriction to the range of adjustment utilized is that the angular range be less than 2π radians with the angle beginning at the reference sensor transmitter 201 and being positive in the direction of rotation, λ being greater than 0 and ψ being less than 2π. In a preferred embodiment the line "a" is a simple straight line passing through the origin on an x-y axis, wherein the point defined by x=ψ/2π and y=ocmx. However, any line "a" that may be described as y=f(x) may be utilized, wherein "f" is any algebraic or trigonometric function that also passes through the same points. There may be instances where it is desirable to use the more complex definition of line "a" due to mechanical or sensitivity considerations.

Figure 6:
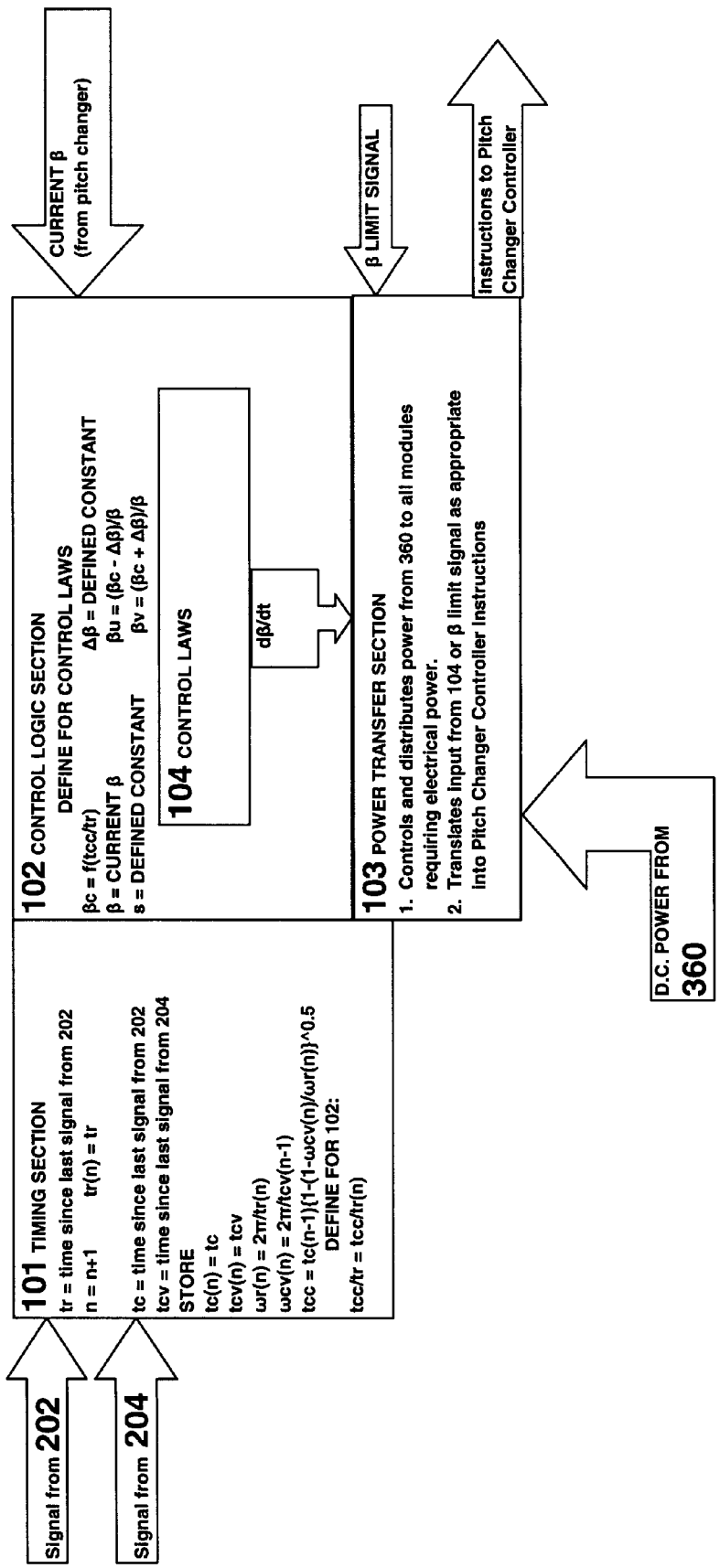
FIG. 6 is a blade control module logic diagram for a simple variable pitch propeller.

Referring now to FIG. 6, illustrated therein is the logic flow of blade control module 100 in a preferred embodiment for a simple variable pitch propeller. The function of blade control module 100 is to provide inputs to pitch changer controller 402 of pitch changer 400 for proposes of achieving and maintaining the selected operating condition. Blade control module 100 preferably receives the inputs from reference sensor 202, command sensor 204, and power control module 360. Based upon said inputs, blade control module 100 solves the necessary equations and determines the required blade pitch change rate and direction, dβ/dt. It should be noted that this basic function is the same for both variable pitch and constant speed propellers, the difference being in the equations solved. For simplicity of explanation blade control module 100 is functionally divided into timing section 101, control logic section 102, power transfer section 103 and control laws 104. Blade control module 100 could also be a single integrated circuit, or a combination of circuits and their associated peripheral devices. Blade control module 100 may also be contained within a single physical apparatus, or some of the components thereof, such as a remotely located power transfer section 103.

Referring still to FIG. 6 and more specifically to timing section 101, illustrated therein are the functions related to the acquisition and storage of the times between signals from reference sensor receiver 202, command sensor receiver 204, the calculation and storage of the angular velocities and accelerations, and the acceleration correction to the previously described tc along with the current value of tcc/tr. The nomenclature utilized therein is described as follows: (1) t=time in seconds; (2) n=array counter; (3) ω=angular velocity in radians/second; (4) tr=reference time; (5) tc=command time; (6) tcc=command time corrected for acceleration; and, (7) tcv=time used to determine mean angular velocity of command sensor. It is preferred to store a minimum of three of each of the time variables and the angular velocities and accelerations in order to make the appropriate corrections for acceleration in the determination of the commanded pitch angle. Since time data is acquired for each revolution, it is not practical to store each of the times recorded; therefore, a limit n is assumed. Once the array defined by n is at its limit, then the oldest variables in the array are discarded and the value of n for the remaining variables is reduced by 1. This is preferably accomplished after the completion of the calculations illustrated, but before the next signal from command sensor receiver 204. This puts some constraints on the speed of the calculations, but will not be a problem with current integrated circuit capability unless the angular velocities are extremely high. The timing device of timing section 101 must preferably be capable of recording times that are accurate to less than 0.1% of the time for a normal revolution. The equations illustrated are simple expressions for angular velocity in terms of the time between sensor signals and are further self-explanatory. Preferably, the purpose of timing section 101 is to define the ratio tcc/tr.

Referring still to FIG. 6 and more specifically to control logic section 102, defined therein are the quantities utilized by control laws 104, wherein the output of control laws, dβ/dt, is transferred to power transfer section 103. A more complete description of said quantities are defined as follows: (1) βc—This blade pitch angle is the soc as described in FIG. 5, and is a simple function, f, of the value tcc/tr, as previously defined; (2) β—This is the current blade pitch angle determined from a position sensor associated with the pitch change mechanism; (3) s—a defined constant having a value equal to the slope of the line "a" illustrated in View A of FIG. 6a; (4) Δβ—This term is a defined constant that sets a tolerance for the term βc/β. A tolerance of some level is required to prevent the constant tiny variations in blade angle that would occur if the system was driving to the condition of (βc/β=1) to the decimal accuracy required for the basic solution of βc.; (5) βu—with the tolerance applied, this is the minimum value of βc/β at which dβ/dt is set to zero; and, (6) βv—With the tolerance applied, this is the maximum value of βc/β at which dβ/dt is set to zero.

In a preferred embodiment the, aforementioned quantities are transferred to control laws 104 during each revolution and are thereby constantly updated, as more fully illustrated and described in FIG. 6a.

Referring still to FIG. 6 and more specifically to power transfer section 103, power transfer section 103 performs the following functions: (1) distribution of the electrical power from power control module 360 to all areas that require power; and, (2) translates the dβ/dt instruction from control logic section 102 into an electrical command to pitch changer controller 402, wherein pitch changer controller 402 is a device that is appropriate for the type of pitch changer 400 utilized in a specific application.

Referring now to FIG. 6a, illustrated therein are control laws 104 applicable to a preferred embodiment of a simple variable pitch propeller. Control laws 104 are preferably easily implemented on a digital integrated circuit, and require nothing more than simple calculations and value checks. The graphical nomenclature used in FIG. 6a is as follows: (1) diamond-shaped boxes represent value checks—a simple yes/no (or true/false) check if one value is larger (>) or smaller (<) than another; (2) rectangular-shaped boxes represent mathematical expressions utilized in control laws 104; and, (3) arrow connectors indicate the direction and sequence of logic flow.

Referring still to FIG. 6a the first check is of βc/β against βu, the lower value of the previously discussed tolerance. If βc/β is greater than the lower tolerance value, it is then checked against the higher value, if it is not greater than the higher value, βv, then dβ/dt is set to zero, as indicated. Depending on the language utilized for programming the integrated circuit, these two checks may be combined. If βc/β is not greater than βu or is greater than βv, then the value of (dβ/dt)ref is calculated. In the expression for (dβ/dt)ref the term "s" is the slope of the line "a" illustrated in view A. As illustrated the slope is negative so that if βc/β is less than 1, (dβ/dt)ref will be positive, if greater than 1, it will be negative. The line "a" in View A can have any slope desired provided the sense is consistent with the logical checks and mathematical expressions. The purpose of using this approach is to allow pitch changer 400 to slow down gradually as the selected operating condition is approached in, order to reduce overshoots and hunting. Once (dβ/dt)ref is determined, it is then checked against the maximum and minimum allowable values as indicated. The maximum and minimum values of dβ/dt are a function of the type of pitch changer 400 utilized for the specific application. As illustrated, there are four possible values of dβ/dt, but only one is passed to power transfer section 103 for use by pitch changer controller 402.

Figure 7:
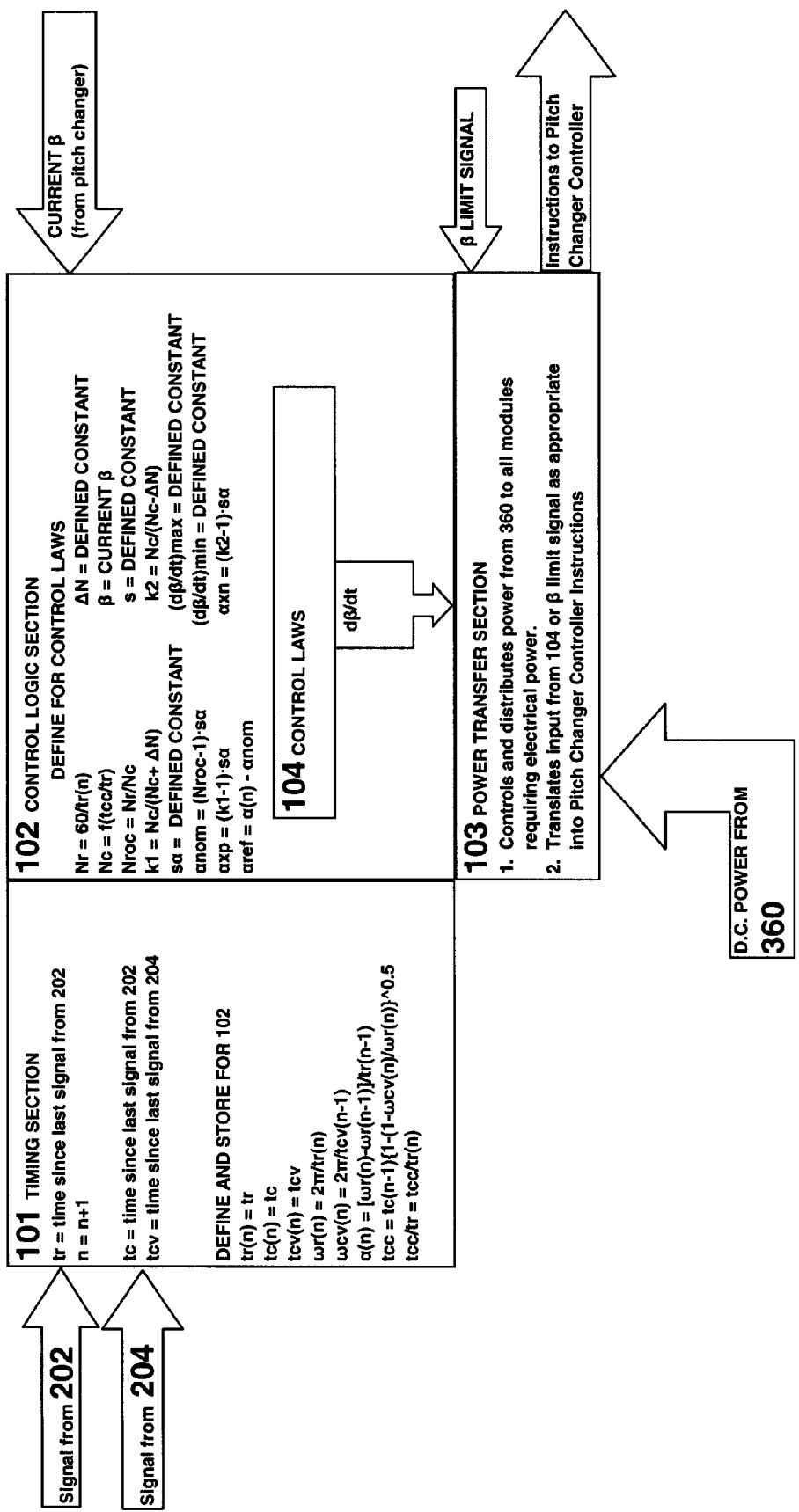
FIG. 7 is a blade control module logic diagram for a simple constant speed propeller.

Referring now to FIG. 7, illustrated therein is the logic flow of blade control module 100 in a preferred embodiment for a simple constant speed propeller. The function of blade control module 100 is to define inputs to pitch changer controller 402 that will result in achieving and maintaining the selected operating condition. The blade control module 100 preferably receives the inputs from the reference sensor 202, command sensor 204, and power control module 360. Based upon said inputs blade, control module 100 solves the necessary equations and determines the required blade pitch change rate and direction dβ/dt. It should be noted that this basic function is the same for variable pitch and constant speed propellers, the difference being in the equations solved. The constant speed propeller requires a somewhat more, complex logic than a variable pitch propeller in that the required β is unknown and changes with conditions such as changing power settings or a change in airspeed or altitude. For simplicity of explanation, blade control module 100 is functionally divided into timing section 101, control logic section 102, power transfer section 103 and control laws 104. Blade control module 100 can also be a single integrated circuit or a combination of circuits and their associated peripheral devices. Blade control module 100 may also be contained in a single physical apparatus or some of the components thereof, such as a remotely located power transfer section 103.

Referring still to FIG. 7 and more specifically to the timing Section 101, illustrated therein are the functions related to the acquisition and storage of the times between signals from the reference sensor receiver 202, command sensor receiver 204, the calculation and storage of the angular velocities and accelerations, and the acceleration correction to the previously described tc along with the current value of tcc/tr. The nomenclature utilized is described below: (1) t=time in seconds; (2) n=array counter; (3) ω=angular velocity in radians/second; (4) α=angular acceleration in radians/(second)$^2$; (5) tr=reference time; (6) tc=command time; (7) tcc=command time corrected for acceleration; and, (8) tcv=time utilized to determine mean angular velocity of command sensor. It is necessary in this preferred embodiment to store a minimum of three of each of the time variables and the angular velocities and accelerations in order to make the appropriate corrections for acceleration in the determination of the commanded angular velocity. Since time data is acquired for each revolution, it is not practical to store each of the times recorded, and, as such, a limit "n" is assumed. Once the array defined by "n" is at its limit, then the oldest variables in the array are discarded, and the value of n for the remaining variables is reduced by 1. This is accomplished after the completion of the calculations illustrated, but before the next signal from command sensor receiver 204. This puts. some constraints on the speed of the calculations, but will not be a problem with current integrated circuit capability unless the angular velocities are extremely high. The timing device must be capable of recording times that are accurate to less than 0.1% of the time for a normal revolution. The equations illustrated are simple. expressions for angular velocity in terms of the time between sensor signals, and are preferably self-explanatory. The purpose of timing section 101 is to preferably define the ratio of listed variables for use in control logic section 102.

Referring still to FIG. 7 and more specifically to the control logic section 102, defined therein are the quantities used by control Laws 104, wherein the output of control Laws 104, dβ/dt, is transferred to power transfer section 103. In this section the angular velocities N are expressed in revolutions per minute, a common measure for propeller operation; however, as long as the units used are consistent, other measures may be utilized just as effectively. A more complete description of the quantities defined is as follows: (1) Nr—The current angular velocity; (2) Nc—This angular velocity is the soc as described under FIG. 5 and is a simple function, f, of the value tcc/tr previously defined; (3) Nr/Nc—The simple ratio used to determine the value of $\alpha$nom, illustrated in View A of FIG. 7a; (4) Nroc—Shorthand for Nr/Nc; (5) $\beta$—This is the current blade pitch angle determined from a position sensor associated with pitch change mechanism 400; (6) s—a defined constant having a value expressed as the slope of the line "a" illustrated in View B of FIG. 7a; (7) s$\alpha$—a defined constant that is the slope of the line $\alpha$nom as illustrated in View A of FIG. 7a, used to define the value of $\alpha$nom for the current value of Nr/Nc; (8) $\Delta$N—a defined constant that sets a tolerance for the term Nr/Nc. A tolerance of some level is required to prevent the constant tiny variations in blade angle that would occur if the system was driving to the condition of (Nr/Nc=1) to the decimal accuracy required for the basic solution of Nc; (9) k1—with the tolerance applied, this is the minimum value of Nr/Nc at which d$\beta$/dt is set to zero when $\alpha$ is between $\alpha$xp and $\alpha$xn; (10) k2—with the tolerance applied, this is the maximum value of Nr/Nc at which d$\beta$/dt is set to zero when $\alpha$ is between $\alpha$xp and $\alpha$xn; (11) $\alpha$nom—the desired angular acceleration for a given value of Nr/Nc; (12) $\alpha$xp—the value of $\alpha$nom at the minimum value of Nr/Nc where d$\beta$/dt is set to zero; (13) $\alpha$xn—the value of $\alpha$nom at the maximum value of Nr/Nc where d$\beta$/dt is set to zero; and, (14) $\alpha$ref—the difference of the current $\alpha$ and $\alpha$nom, utilized to determine d$\beta$/dt.

In a preferred embodiment these quantities are transferred to control laws 104, illustrated and described more fully in FIG. 7a, during each revolution, and are thereby constantly updated.

Referring still to FIG. 7 and more specifically to the power transfer section 103, power transfer section 103 performs the following functions: (1) power distribution section 103A distributes the electrical power from power control module 360 to all areas that require power; and, (2) translates the d$\beta$/dt instruction from control logic section 102 into an appropriate electrical command to pitch changer controller 402, wherein pitch changer controller 402 is preferably a device that is appropriate for the type of pitch changer 400 utilized in a specific application.

Referring now to FIG. 7a, illustrated therein are control laws 104 applicable to a preferred embodiment of a simple constant speed propeller. Control laws 104 are very simple to implement on a digital integrated circuit and preferably require simple calculations and value checks. The graphical nomenclature used in FIG. 7a is as follows: (1) diamond-shaped boxes represent value checks—a simple yes/no (or true/false) check if one value is larger (>) or smaller (<) than another; (2) rectangular-shaped boxes represent mathematical expressions utilized in control laws 104; and, (3) arrow connectors indicate the direction and sequence of logic flow.

Referring still to FIG. 7a the first check is of Nroc against k1, the lower value of the previously discussed tolerance. If Nroc is greater than the lower tolerance value, it is then checked against the higher value, if it is not greater than the than the higher value, k2, the next checks are for angular acceleration. If $\alpha$ is greater than $\alpha$xp and less than $\alpha$xn then d$\beta$/dt is set to zero as indicated. Depending on the language used for programming the integrated circuit, these four checks may be combined into one for Nroc and one for $\alpha$. If Nroc is not greater than k1, or is greater than k2, or if $\alpha$ is greater than $\alpha$xp, or less than $\alpha$xn, then the value of (d$\beta$/dt)ref is calculated. In the expression for (d$\beta$/dt)ref the term "s" is the slope of the line "a" illustrated in View B. As illustrated the slope is positive so that if $\alpha$ref is positive, (d$\beta$/dt)ref will be positive, or negative if $\alpha$ref is negative. The line "a" in View B can have any slope desired provided the sense is consistent with the logical checks and mathematical expressions. The purpose of utilizing this approach is to allow pitch changer 400 to slow down gradually as the selected operating condition is approached in order to reduce overshoots and hunting. Once (d$\beta$/dt)ref is determined, it is then checked against the maximum and minimum allowable values as indicated. The maximum and minimum values of d$\beta$/dt are a function of the type pitch changer 400 utilized for the specific application. As illustrated, there are four possible values of d$\beta$/dt, but only one is passed to power transfer section 103 for use by pitch changer controller 402.

Referring now to FIG. 8, illustrated therein is a conventional aircraft propeller equipped with the components of the present invention in a typical arrangement for a simple variable pitch or constant speed propeller. The primary components of the present invention are blade control module 100, command module 200, power module 300, pitch changer 400, and storage battery 800, wherein propeller hub 500, propeller blades 600, and propeller shaft housing 700 are conventional depictions common to any variable pitch or constant speed propeller. The components illustrated in FIG. 8 do not necessarily depict the precise size, shape or location of those components. Command module 200 and power module 300 are preferably located at the interface of the fixed propeller shaft housing 700 and the rotating propeller hub 500. The precise locations of blade control module 100, pitch changer 400, and storage battery 800 preferably depend on the design of the specific propeller, and are not required to be in the arrangement as shown. As previously discussed, pitch changer 400 may be any one of a number of reversible variable rate devices, such as, for exemplary purposes only, electric motors, electrical stepper motors, electrical linear actuators, electro hydraulic units, and electro pneumatic units, wherein the device utilized will depend on the design of the specific propeller. Storage battery 800 must preferably be of sufficient capacity to drive pitch changer 400 at its maximum irate for several full cycles of blade pitch travel, the number of cycles required depending on the specific application and its expected use.

Figure 9:
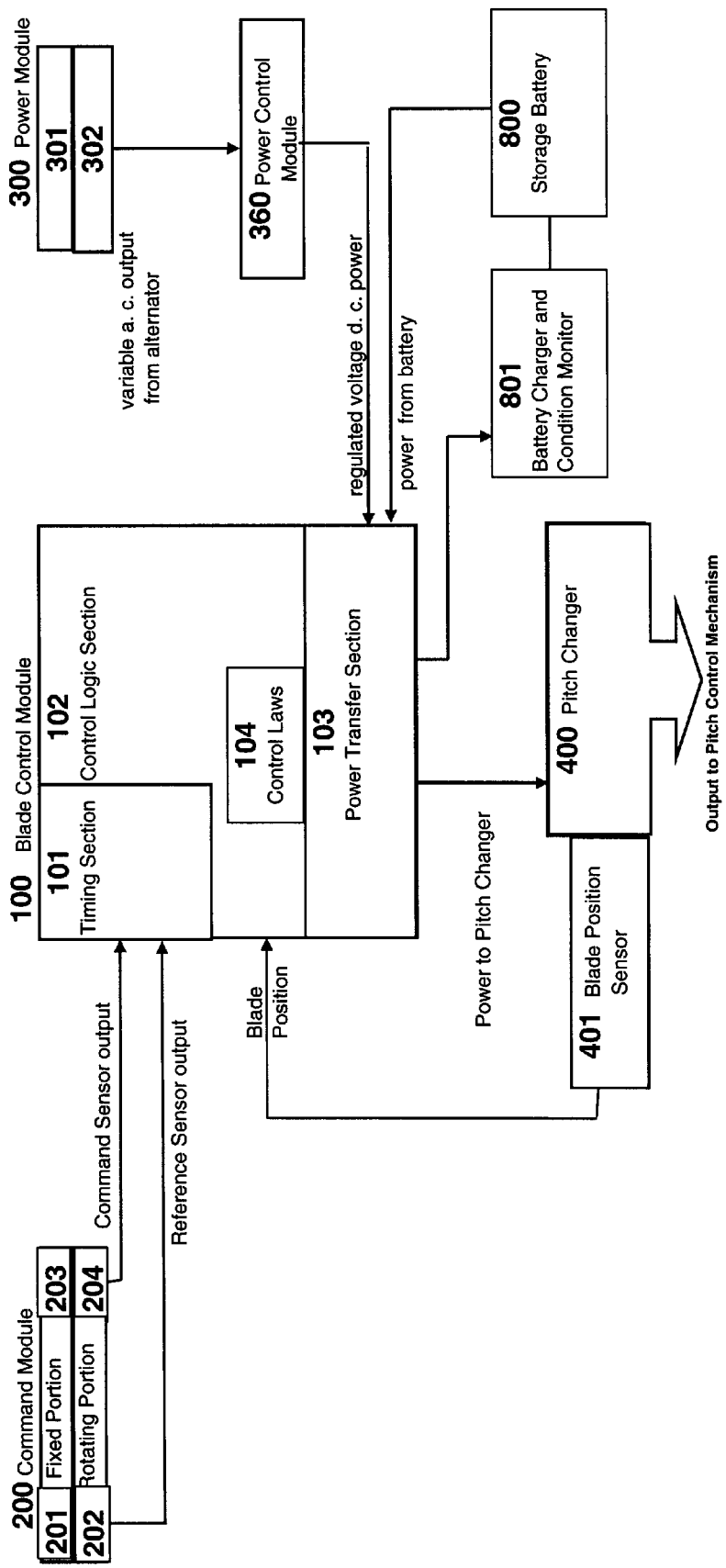
FIG. 9 is a schematic drawing of the present invention indicating the flow of power and information through the components of a simple constant speed or variable pitch propeller with feathering capability and/or reverse pitch capability.

Referring now to FIG. 9, illustrated therein is an operational schematic of a variable pitch or constant speed propeller with feathering and/or reverse thrust capability in a preferred embodiment. Power module 300 is a simple permanent magnet alternator, wherein permanent magnet section 301 is fixed to propeller shaft housing 700, and wherein rotating coils 302 are attached to propeller hub 500. The variable voltage and frequency a.c. output from coils 302 is preferably conveyed to power control module 360 which preferably provides constant voltage d.c. power to power transfer section 103 of blade control module 100, similar in fashion to the usual automotive arrangement. Power transfer section 103 preferably distributes, power as directed by control logic section 102, as well as provides the requisite power to operate blade control module 100. Power transfer section 103 also preferably distributes power to combination battery charger and condition monitor 801, and switches the system to battery power from storage battery 800 whenever the power output from power module is inadequate for system operation.

Command module 200 preferably possesses a reference sensor having two portion, fixed portion 201 attached to propeller shaft housing 700 and rotating detector 202 attached to propeller hub 500, and further possesses a command sensor having two portions, adjustable portion 203 attached to propeller shaft housing 700 and rotating detector 204 attached to propeller hub 500. The output signals from the non-contact type reference sensor detector 202 and command sensor detector 204 are conveyed to timing section 101 of blade control module 100. Timing section 101 contains a common timing base, such as a quartz crystal, and measures the time between each reference sensor 202 signal, tr, and the time from each reference sensor 202 signal and the next command sensor 204 signal tc, as well as the time between command sensor passages tcv. A minimum of two sequential times are retained, wherein the times are utilized to determine the current angular velocity and angular acceleration. Control logic section 102 of blade control module 100 uses the angular velocity, angular acceleration, and current tc value to determine the current operating condition and the commanded operating condition. Based on a logical evaluation of current and commanded conditions and blade position as feedback from blade position sensor 401, the requirements for a blade pitch change and the pitch change rate are determined, wherein these requirements are conveyed to power transfer section 103 for application of the appropriate power to pitch changer 400.

Referring still to FIG. 9, battery 800 and combination battery charger and condition monitor 801 are preferably a necessary requirement only for feathering capability. However, their use may be desirable as a backup power system for a propeller without feathering capability, or as an auxiliary power source for a system that occasionally requires operating conditions at such reduced angular velocities that the alternator cannot provide adequate power.

Figure 10:
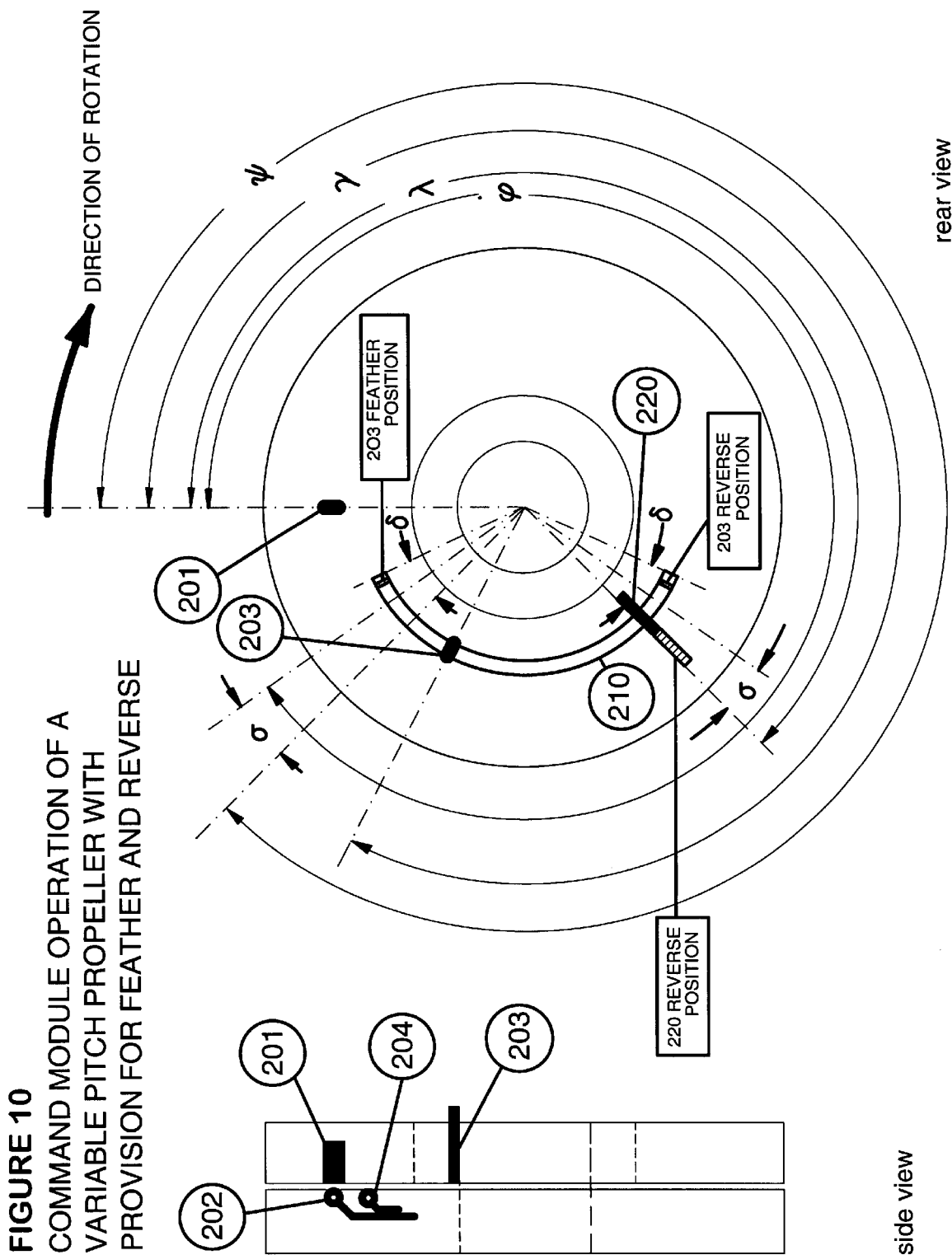
FIG. 10 is a rear and side view of the command module showing the arrangement of the fixed and adjustable non contact sensor components of a variable pitch propeller with feathering capability and/or reverse pitch capability.

Referring now to FIG. 10, illustrated therein is a preferred embodiment of command module 200 for a variable pitch propeller with provisions for both feather and reverse capability. The feather and reverse capabilities are independent of each other and, as such, either may be incorporated without including the other. Both feather and reverse capabilities are included in FIG. 10 for illustrative purposes. The selection of feather, reverse, or both capabilities, depends on the specific application of the propeller. As previously illustrated in FIG. 4 the normal operating range of the propeller lies between the angles λ and ψ. To add feather and/or reverse capability, command sensor transmitter 203 travel (λ-ψ) is extended by the angle δ to obtain a command sensor transmitter 203 position that may be defined as a feather or reverse command. The sector 210 illustrates the total available travel of command sensor transmitter 203. The selected propeller operating condition is a direct function of the azimuthal relation of command sensor transmitter 263 to reference sensor transmitter 201, designated as the angle γ. The angles ψ and λ represent the limits of command sensor transmitter 203 adjustment relative to reference sensor transmitter 201 for normal operation. The position of command sensor transmitter 203 sets the operating condition of the propeller. The solution for the selected operating condition of the propeller requires the determination of the angle γ, wherein this is preferably accomplished in the blade control module 100. The angles shown in FIG. 10 are illustrative only, wherein the limits expressed in radians are as follows; (ψ+δ) must be less than 2π and greater than (λ-δ), (λ-δ) must be greater than 0, and γ may be any valuei between (λ-δ) and (ψ+δ). Considering now a propeller operating at a constant angular velocity ω, and defining the time for one complete revolution of the propeller as tr and the time from reference sensor detector 202 passage of reference sensor transmitter 201 to command sensor detector 204 passage of command sensor transmitter 203 as tc, it is readily seen that the angle γ is equal to 2π(tc/tr), with the angle expressed in radians. If the angular velocity is not constant the previous equation does not hold; however, a simple correction to tc provides an accurate solution for λ, wherein the corrected time is defined as tcc. The diagram of FIG. 10 is schematic in nature and is not intended to be construed as a specific design.

Referring still to FIG. 10, in a preferred embodiment of the present invention, the blade pitch range for normal operation is defined by the angle (ψ-λ) with λ representing the minimum normal blade pitch setting, and ψ representing the highest normal pitch setting. The minimum and maximum blade pitch angle settings are stored in blade control module 100. The angle σ represents a tolerance buffer to prevent inadvertent feathering or reverse activity due to sensor tolerances, acceleration variations in tcc, or mechanical misalignments due to installation, temperature changes, or the like. The propeller is feathered by moving command sensor transmitter 203 to an angle greater than (ψ+σ), wherein blade control module 100 then translates this angle as a command to move the blades to the feather position, that position also being stored in control module 100.

Reversing the pitch is somewhat different in operation, but the same in principle. Command sensor transmitter is prevented from moving to an angle less than λ by reverse gate 220 if the airplane is not on the ground. This is usually accomplished by sensors on the landing gear. When reverse gate 220 is moved to the reverse position, the command sensor transmitter 203 may be moved to an angular position γ that is less than (λ-σ), wherein command module 100 translates this as a command to move the blades to the reverse pitch position, that position also being stored in command module 100.

Figure 11:
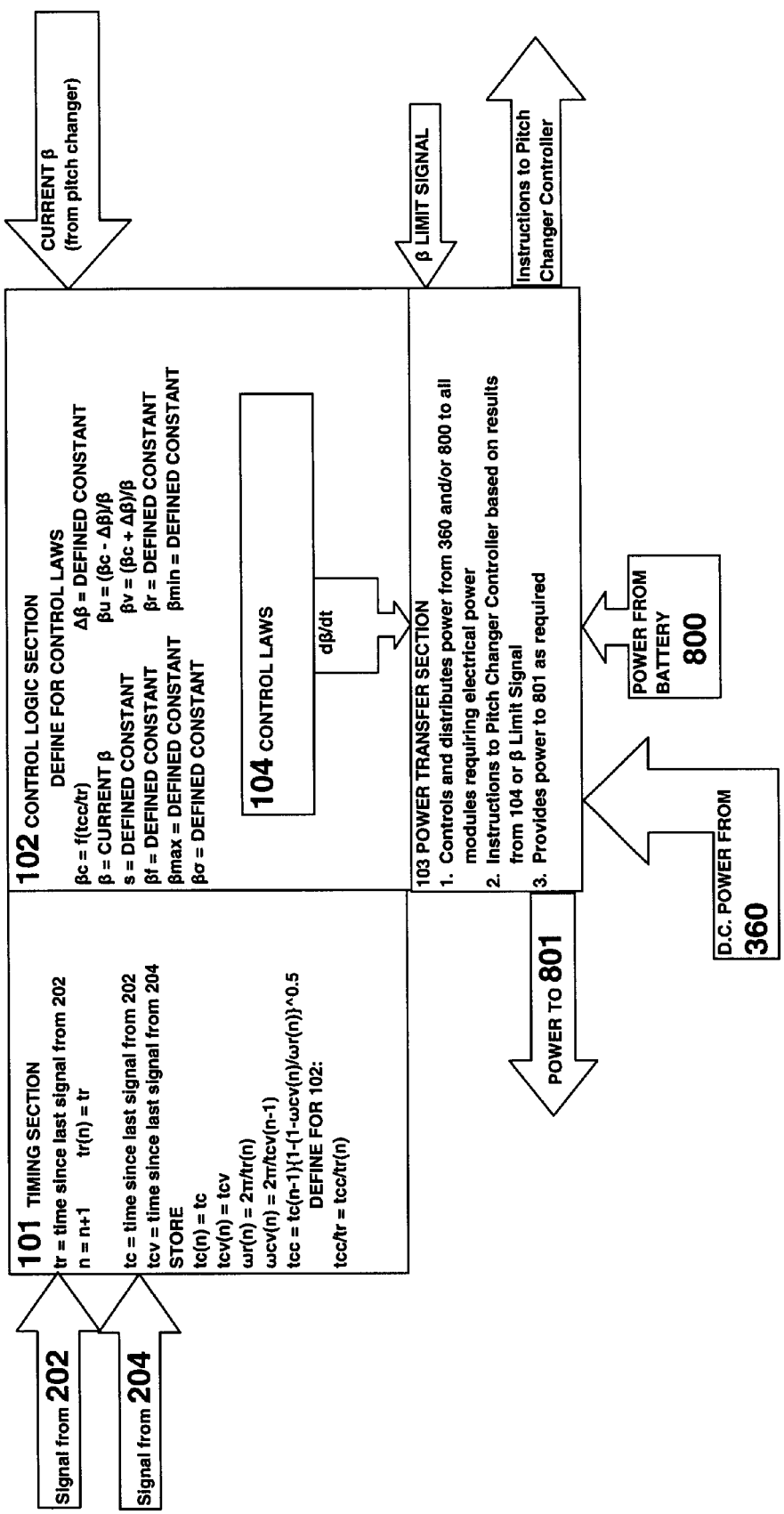
FIG. 11 is a blade control module logic diagram for a simple variable pitch propeller with feathering capability and/or reverse pitch capability.

Referring now to FIG. 11, illustrated therein is the logic flow of blade control module 100 in a preferred embodiment for a variable pitch propeller with feathering and/or reverse pitch capability. Blade control module 100 is essentially equivalent in function to that illustrated in FIG. 6 with the addition of constants defining the feather and/or the reverse angles, the normal operating maximum and minimum blade angles, blade angles corresponding to feather and/or reverse pitch commands, and, in the case of feather capability, a battery use capability. The function of blade control module 100 is to provide inputs to pitch changer controller 402 that will result in achieving and maintaining the selected operating condition. Blade control module 100 is that portion of the current invention that receives the inputs from reference sensor 202, command sensor 204, and power control module 360. Based upon said inputs, blade control module 100 solves the necessary equations and determines the required blade pitch change rate and direction dβ/dt. It should be noted that this basic function is the same for variable pitch and constant speed propellers, the difference being in the equations solved. For simplicity of explanation, blade control module 100 is functionally divided into timing section 101, control logic section 102, power transfer section 103 and control laws 104. Blade control module 100 can also be a single integrated circuit or a combination of circuits and their associated peripheral devices. Blade control module 100 may also be contained in a single physical apparatus or some of the components thereof, such as a remotely located power transfer section 103.

Referring still to FIG. 11 and more specifically to timing section 101, illustrated therein are the functions related to the acquisition and storage of the times between signals from reference sensor receiver 202, command sensor receiver 204, the calculation and storage of the angular velocities and accelerations, and the acceleration correction to the previously described tc along with the current value of tcc/tr. The nomenclature utilized is described below: (1) t=time in seconds; (2) n=array counter; (3) ω=angular velocity in radians/second; (4) tr=reference time; (5) tc=command time; (6) tcc=command time corrected for acceleration; and, (7) tcv=time used to determine mean angular velocity of command sensor 204. It is necessary in this preferred embodiment to store a minimum of three of each of the time variables and the angular velocities and accelerations in order to make the appropriate corrections for acceleration in the determination of the commanded pitch angle. Since time data is acquired for each revolution, it is not practical to store each of the times recorded, and, as such, a limit "n" is assumed. Once the array defined by "n" is at its limit, then the oldest variables in the array are discarded and the value of "n" for the remaining variables is reduced by 1, wherein this is accomplished after the completion of the calculations illustrated, but before the next signal from command sensor 204. This puts some constraints on the speed of the calculations, but will not be a problem with current integrated circuit capability unless the angular velocities are extremely high. The timing device of timing section 101 must be capable of recording times that are accurate to less than 0.1% of the time for a normal revolution. The equations illustrated are simple expressions for angular velocity in terms of the time between sensor signals, and are self-explanatory. The purpose of timing section 101 is to define the ratio tcc/tr.

Referring still to FIG. 11, and more specifically to the control logic section 102, defined therein are the quantities utilized by control laws 104, wherein the output of control laws 104, dβ/dt, is transferred to power transfer section 103. A more complete description of the quantities defined is as follows: (1) βc—this blade pitch angle is the soc as described under FIG. 5, and is a simple function, f, of the value tcc/tr previously defined; (2) β—this is the current blade pitch angle determined from a position sensor associated with pitch change mechanism 400; (3) s—a defined constant having a value expressed as the slope of the line "a" illustrated in View A of FIG. 6*a*; (4) Δβ—this term is a defined constant that sets a tolerance for the term βc/β. A tolerance of some level is required to prevent the constant tiny variations in blade angle that would occur if the system was driving to the condition of (βc/β=1) to the decimal accuracy required for the basic solution of βc; (5) βu—with the tolerance applied, this is the minimum value of βc/β at which dβ/dt is set to zero; (6) βv—with the tolerance applied, this is the maximum value of βc/β at which dβ/dt is set to zero; (7) βσ—an angular increment applied to each end of the normal operating β range as a buffer to prevent inadvertent feather or reverse operation; (8) βmax—the maximum blade pitch angle of the normal operating range; (9) βmin—the minimum blade pitch angle of the normal operating range; (10) βf—the blade angle for the feathered condition; and, (11) βr—the blade angle for the reverse condition. In a preferred embodiment these quantities are transferred to control laws 104, illustrated and described more fully in FIG. 11*a*, during each revolution, and are thereby constantly updated.

Referring still to FIG. 11 and more specifically to the power transfer section 103, power transfer section 103 performs the following functions: (1) distributes the electrical power from power control module 360 to all areas that require power including pitch changer 400 and combination battery charger and condition monitor 801; (2) monitors the power available from power control module 360 and uses power from battery 800 as required; and, (3) translates the dβ/dt instruction from control logic section 102 into an electrical command to pitch changer controller 402, wherein pitch changer controller is a device that is appropriate for the type of pitch changer 400 utilized in a specific application.

Figure 11A:
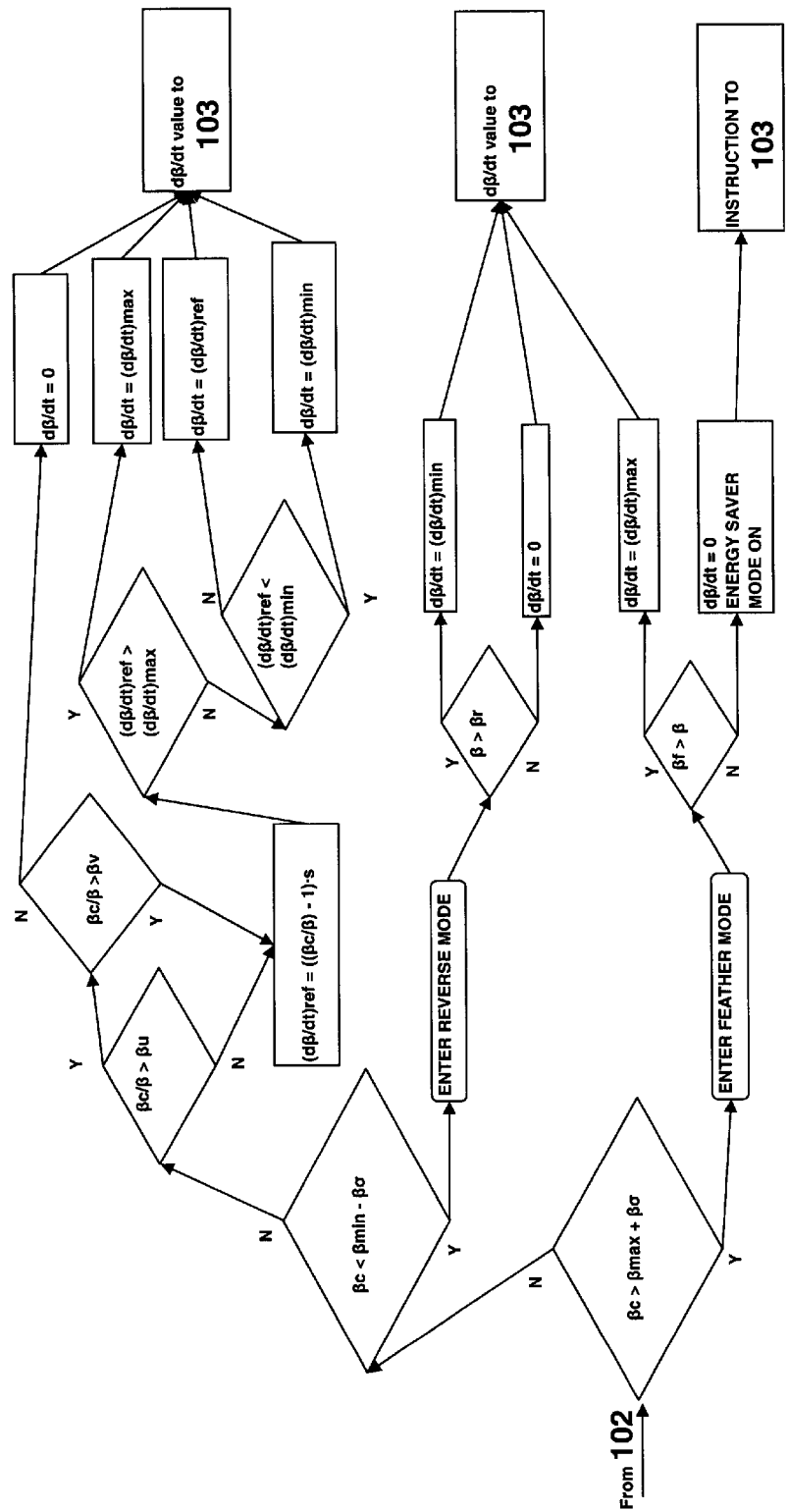
FIG. 11a is an illustration of control laws used in the blade control module logic for a variable pitch propeller with feathering and/or reverse pitch capability.

Referring now to FIG. 11*a*, illustrated therein are control laws 104 applicable to a preferred embodiment of a variable pitch propeller with feather and reverse pitch capability. It should be noted that this illustration is equivalent to FIG. 6*a* with the addition of the logic required to implement a response to a feather or reverse command. These laws are very simple to implement on a digital integrated circuit and require nothing more than simple calculations and value checks. The graphical nomenclature utilized in FIG. 11*a* is as follows: (1) diamond-shaped boxes represent value checks—a simple yes/no (or true/false) check if one value is larger (>) or smaller (<) than another; (2) rectangular-shaped boxes represent mathematical expressions utilized in control laws 104; and, (3) arrow connectors indicate the direction and sequence of logic flow.

Referring still to FIG. 11*a*, the first check is of βc against (βmax+βσ). If βc is greater than (βmax+βσ), it is interpreted as the command to drive the blade position to βf, the feather position; if less than (βmax+βσ) the next check is done. The next check is of βc against (βmin−βσ). If βc is less than (βmin−βσ), it is interpreted as the command to drive the blade position to βr, the reverse position. When it has been determined that βc lies between (βmax+βσ) and (βmin−βσ), the propeller command has been determined to be in the normal operating range and checks βc/β against βu, the lower value of the above-referenced tolerance. If βc/β is greater than the lower tolerance value, it is next checked against the higher value; if it is not greater than the than the higher value, βv, then dβ/dt is set to zero as indicated. Depending on the language used for programming the integrated circuit, these two checks may be combined. If βc/β is not greater than βu, or is greater than βv, then the value of (dβ/dt)ref is calculated. In the expression for (dβ/dt)ref, the term "s" is the slope of the line "a" illustrated in view A. As illustrated, the slope is negative so that if βc/β is less than 1, (dβ/dt)ref will be positive; if greater than 1, it will be negative. The line "a" in View A can have any slope desired provided the sense is consistent with the logical checks and mathematical expressions. The purpose of using this approach is to allow pitch changer 400 to slow down gradually as the selected operating condition is approached in order to reduce overshoots and hunting. Once (dβ/dt)ref is determined, it is then checked against the maximum and minimum allowable values as indicated. The maximum and minimum values of dβ/dt are a function of the type of pitch changer 400 utilized for a specific application. As illustrated, there are four possible values of dβ/dt, but only one is passed to power transfer section 103 for use by the pitch changer controller 402.

Referring still to FIG. 11*a* when the feather command is initiated, the feather mode is invoked, wherein dβ/dt is set to the maximum value and remains there until β is equal to βf as indicated by the logic check. Once the blades are in the feather position, dβ/dt is set to 0 and the system enters an energy saver mode to conserve the battery power. In a preferred embodiment, this mode would shut off all power from the battery except for the minimal power required to maintain timing section. 101 of blade control module 100 in a live state. Unfeathering is accomplished by moving command sensor transmitter 203 into the normal operating range and starting the engine. As soon as a value of tcc/tr has been determined, normal operation will resume.

Referring still to FIG. 11a when the reverse command is initiated, the reverse mode is invoked, wherein $d\beta/dt$ is set to the minimum value and remains there until $\beta$ is equal to $\beta r$ as indicated by the logic check. Once the blades are in the reverse position, $d\beta/dt$ is set to 0. Moving the blades out of the reverse position is accomplished by moving command sensor transmitter 203 into the normal operating range.

Referring now to FIG. 12, illustrated therein in a preferred embodiment is command module 200 for a constant speed propeller with provisions for feather and reverse capability and function. The feather and reverse capabilities are independent of each other and either may be incorporated without including the other. Both feather and reverse capabilities are included in FIG. 12 for illustrative purposes. The selection of feather, reverse, or both capabilities, depends on the specific application of the propeller. As previously illustrated in FIG. 4 the normal operating range of the propeller lies between the angles $\lambda$ and $\psi$. To add feather and/or reverse capability command sensor 203 travel $(\lambda-\psi)$ is extended by the angle $\delta$ to obtain a command sensor position that may be defined as a feather or reverse command. The sector 210 illustrates the total available travel of command sensor transmitter 203. The selected propeller operating condition is a direct function of the azimuthal relation of command sensor transmitter 203 to reference sensor transmitter 201, designated as the angle $\gamma$. The angles $\psi$ and $\lambda$ represent the limits of command sensor transmitter 203 adjustment relative to reference sensor transmitter 201 for normal operation. The position of command sensor transmitter 203 sets the operating condition of the propeller. The solution for the selected operating condition of the propeller requires the determination of the angle $\gamma$, wherein this is preferably accomplished in blade control module 100. The angles shown in FIG. 12 are illustrative only, the limits expressed in radians are as follows: $(\psi+\delta)$ must be less than $2\pi$ and greater than $(\lambda-\delta)$, $(\lambda-\delta)$ must be greater than 0, and $\gamma$ may be any value between $(\lambda-\delta)$ and $(\psi+\delta)$. Considering now a propeller operating at a constant angular velocity $\omega$ and defining the time for one complete revolution of the propeller as tr and the time from reference sensor detector 202 passage of reference sensor transmitter 201 to command sensor detector 204 passage of command sensor transmitter 203 as tc, it is readily seen that the angle $\gamma$ is equal to $2\pi(tc/tr)$ with the angle expressed in radians. If the angular velocity is not constant, the previous equation does not hold; however, a simple correction to tc provides an accurate solution for $\lambda$ and the corrected time defined as tcc. The diagram of FIG. 12 is schematic in nature and is not to be construed as a specific design.

Referring still to FIG. 12, in a preferred embodiment of the present invention, the blade pitch range for normal operation is defined by the angle $(\psi-\lambda)$, with $\lambda$ representing the minimum normal angular velocity setting and $\psi$ representing the highest normal angular velocity setting. The minimum and maximum angular velocity settings are stored in control module 100. The angle $\sigma$ represents a tolerance buffer to prevent inadvertent feathering or reverse operations due to sensor tolerances, acceleration variations in tcc, or mechanical misalignments due to installation, temperature changes, etc. The propeller is feathered by moving command sensor transmitter 203 to an angle less than $(\lambda-\sigma)$, wherein control module 100 then translates this angle as a command to move the blades to the feather position, that position also being stored in the command module 100. Reversing the pitch is somewhat different in operation but the same in principle. The command sensor transmitter is prevented from moving to an angle less than $\lambda$ by reverse gate 220 if the airplane is not on the ground. This is usually accomplished by sensors on the landing gear. When reverse gate 220 is moved to the reverse position, the command sensor transmitter 203 may be moved to an angular position $\gamma$ that is greater than $(\psi+\sigma)$, which command module 100 translates as a command to move the blades to the reverse pitch position, that position also being stored in command module 100. Note that in FIG. 12, the positions of feather and reverse are reversed from those shown in FIG. 10. The reason for this reversal is that in both cases an increase in $\gamma$ indicates an increase in the commanded value. For both the variable pitch and constant speed propellers, the feather setting is the absolute maximum pitch setting, and reverse is the absolute minimum pitch setting. The constant speed propeller does not control pitch directly and an increase in angular velocity is associated with a decrease in pitch setting, and the reverse command is at the same end of sector 210 that is associated with the minimum blade pitch setting for normal operation.

Figure 13:
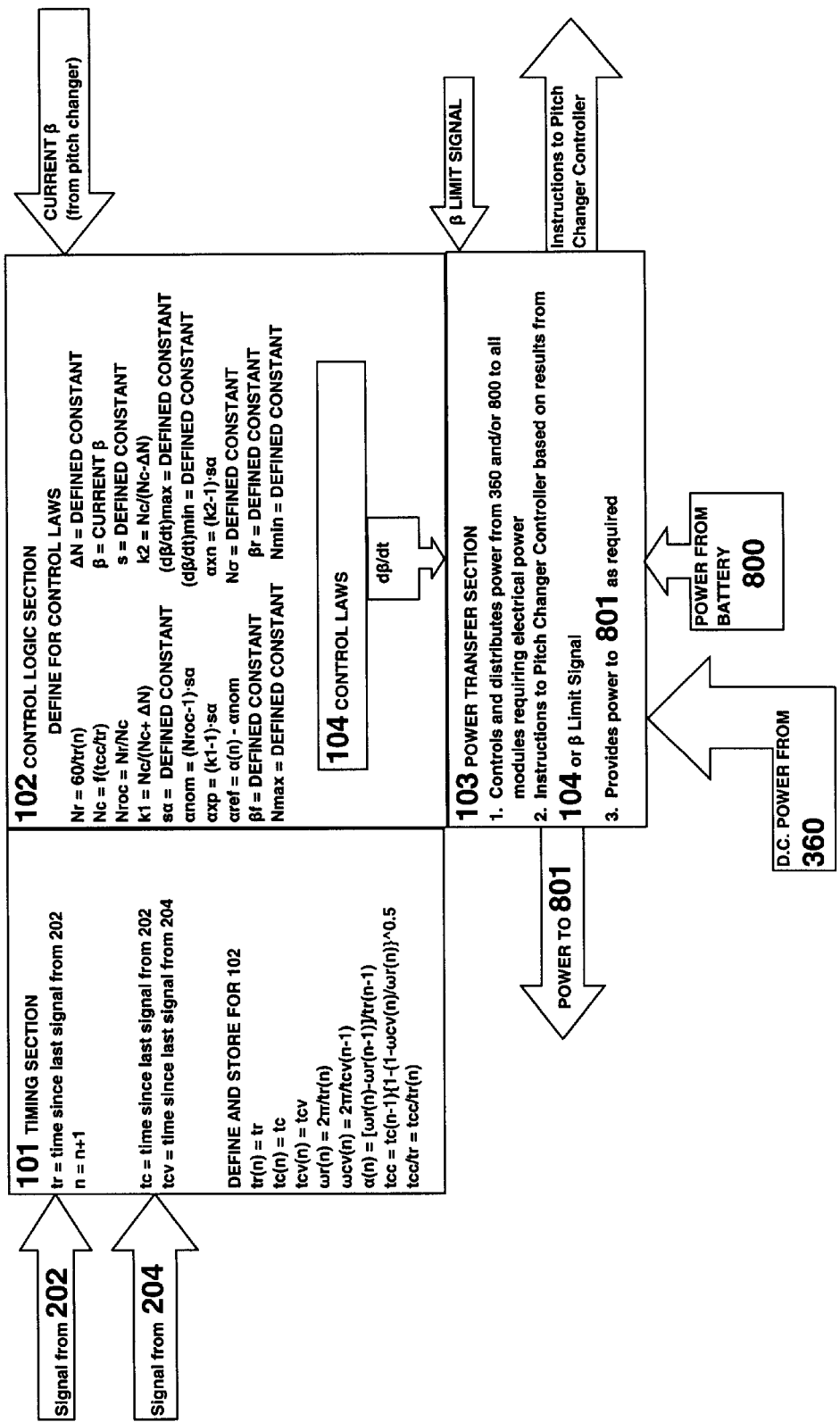
FIG. 13 is a blade control module logic diagram for a constant speed propeller with feathering capability and/or reverse pitch capability.

Referring now to FIG. 13, illustrated therein is the logic flow of blade control module 100 in a preferred embodiment for a constant speed propeller with feathering and/or reverse pitch capabilities. Blade control module 100 is essentially equivalent in form and function to that illustrated in FIG. 7 with the addition of constants defining the feather and/or the reverse angles, the normal operation maximum and minimum angular velocities, blade angles corresponding to feather and/or reverse pitch commands, and, in the case of feather capability, a battery use capability. The function of blade control module 100 is to define inputs to pitch changer controller 402 that will result in achieving and maintaining the selected operating condition. Blade control module 100 is that portion of the current invention that receives the inputs from the reference sensor 202, command sensor 204, and power control module 360. Based upon said inputs, blade control module 100 solves the necessary equations and determines the required blade pitch change rate and direction, $d\beta/dt$. It should be noted that this basic function is the same for variable pitch and constant speed propellers, the difference being in the equations solved. The constant speed propeller requires a somewhat more complex logic than a variable pitch propeller in that the required $\beta$ is unknown and changes with conditions such as changing power settings or a change in airspeed or altitude. For simplicity of explanation, blade control module 100 is functionally divided into timing section 101, control logic section 102, power transfer section 103 and control laws 104. Blade control module 100 can also be a single integrated circuit or a combination of circuits and their associated peripheral devices. Blade control module 100 may also be contained in a single physical apparatus or some of the components thereof, such as a remotely located power transfer section 103.

Referring still to FIG. 13 and more specifically to, the timing section 101, illustrated therein are the functions related to the acquisition and storage of the times between signals from reference sensor receiver 202, command sensor receiver 204, the calculation and storage of the angular velocities and accelerations, and the acceleration correction to the previously described tc along with the current value of tcc/tr. The nomenclature utilized is described below: (1) t=time in seconds; (2) n=array counter; (3) $\omega$=angular velocity in radians/second; (4) $\alpha$=angular acceleration in radians/(second)$^2$; (5) tr=reference time; (6) tc=command time; (7) tcc=command time corrected for acceleration; and, (8) tcv=time utilized to determine mean angular velocity of command sensor. It is necessary in this preferred embodiment to store a minimum of three of each of the time variables and the angular velocities and accelerations in order to make the appropriate corrections for acceleration in the determination of the commanded pitch angle. Since time data is acquired for each revolution it is not practical to store each of the times recorded so a limit "n" is assumed. Once the array defined by "n" is at its limit then the oldest variables in the array are discarded and the value of "n" for the remaining variables is reduced by 1. This is accomplished after the completion of the calculations illustrated, but before the next signal from command sensor receiver 204. This puts some constraints on the speed of the calculations, but will not be a problem with current integrated circuit capability unless the angular velocities are extremely high. The timing device must be capable of recording times that are accurate to less than 0.1% of the time for a normal revolution. The equations illustrated are simple expressions for angular velocity in terms of the time between sensor signals and are self-explanatory. The purpose of timing section 101 is to define the ratio the listed variables for use in control logic section 102.

Referring still to FIG. 13 and more specifically to the control logic section 102, wherein are defined the quantities used by the control laws 104 and the output of the control laws, $d\beta/dt$, is transferred to the power transfer section 103. In this section the angular velocities N are expressed in revolutions per minute, a common measure for propeller operation, but, so long as the units used are consistent, other measures may be used equally well. A more complete description of the quantities defined is as follows: (1) Nr—The current angular velocity; (2) Nmax—The maximum angular velocity of the normal operating range; (3) Nmin—The minimum angular velocity of the normal operating range; (4) N$\sigma$—An angular velocity increment applied to the normal operating N range as a buffer to prevent inadvertent feather or reverse operation; (5) Nc—This angular velocity is the soc as described under FIG. 5 and is a simple function, f, of the value tcc/tr previously defined; (6) Nr/Nc—The simple ratio used to determine the value of $\alpha$nom, illustrated in View A of FIG. 7a; (7) Nroc—shorthand for Nr/Nc; (8) $\beta$—This is the current blade pitch angle determined from a position sensor associated with the pitch change mechanism; (9) $\beta$f—The blade angle for the feathered condition; (10) $\beta$r The blade angle for the reverse condition; (11) s—defined as a constant and its value is the slope of the line "a" illustrated in View B of FIG. 7a; (12) s$\alpha$—is a defined constant that is the slope of the line $\alpha$nom as illustrated in View A of FIG. 7a. It is used to define the value of $\alpha$nom for the current value of Nr/Nc; (13) $\Delta$N—This term is a defined constant that sets a tolerance for the term Nr/Nc. A tolerance of some level is required to prevent the constant tiny variations in blade angle that would occur if the system was driving to the condition of (Nr/Nc= 1) to the decimal accuracy required for the basic solution of Nc; (14) k1—with the tolerance applied, this is the minimum value of Nr/Nc at which $d\beta/dt$ is set to zero when $\alpha$ is between $\alpha$xp and $\alpha$xn; (15) k2—with the tolerance applied, this is the maximum value of Nr/Nc at which $d\beta/dt$ is set to zero when a is between $\alpha$xp and $\alpha$xn; (16) $\alpha$nom—is the desired angular acceleration for a given value of Nr/Nc; (17) $\alpha$xp—is the value of $\alpha$nom at the minimum value of Nr/Nc where $d\beta/dt$ is set to zero; (18) $\alpha$xn—is the value of $\alpha$nom at the maximum value of Nr/Nc where $d\beta/dt$ is set to zero; and, (19) $\alpha$ref—is the difference of the current $\alpha$ and $\alpha$nom and is used to determine $d\beta/dt$. In a preferred embodiment these quantities are transferred to the control laws, illustrated and described more fully in FIG. 13a, during each revolution and are thereby constantly updated.

Referring still to FIG. 13 and more specifically to power transfer section 103 which performs the following functions: (1) distributes the electrical power from power control module 360 to all areas that require power including pitch changer 400 and combination battery charger and condition monitor 801; (2) monitors the power available from power control module 360 and uses power from the battery 800 as required; (3) translates the $d\beta/dt$ instruction from control logic section 102 into an appropriate electrical command to pitch changer controller 402, wherein pitch changer controller 402 is preferably a device that is appropriate for the type of pitch changer used in a specific application.

Referring now to FIG. 13a, illustrated therein are control laws 104 applicable to a preferred embodiment of a constant speed propeller with feather and reverse pitch capabilities. It should be noted that this illustration is the same as FIG. 7a with the addition of the logic required to implement a response to a feather or reverse command. These laws are very simple to implement on a digital integrated circuit and require nothing more than simple calculations and value checks. The graphical nomenclature utilized in FIG. 11a is as follows: (1) diamond-shaped boxes represent value checks—a simple yes/no (or true/false) check if one value is larger (>) or smaller (<) than another; (2) rectangular-shaped boxes represent mathematical expressions utilized in control laws 104; and, (3) arrow connectors indicate the direction and sequence of logic flow.

Referring still to FIG. 13a, the first check is of Nc against (Nmin–N$\sigma$). If Nc is less than (Nmin–N$\sigma$), it is interpreted as the command to drive the blade position to $\beta$f, the feather position; if greater than (Nmin–N$\sigma$), the next check is done. The next check is of Nc against (Nmax+N$\sigma$). If Nc is greater than (Nmin+N$\sigma$), it is interpreted as the command to drive the blade position to $\beta$r, the reverse position. When it has been determined that Nc lies between (Nmax+N$\sigma$) and (Nmin–N$\sigma$), the propeller command has been determined to be in the normal operating range and checks Nroc against k1, the lower value of the previously discussed tolerance. If Nroc is greater than the lower tolerance value, it is next checked against the higher value, if it is not greater than the higher value k2, the next checks are for angular acceleration. If $\alpha$ is greater than $\alpha$xp and less than $\alpha$xn, then $d\beta/dt$ is set to zero as indicated. Depending on the language used for programming the integrated circuit, these four checks may be combined into one for Nroc and one for $\alpha$. If Nroc is not greater than k1, or is greater than k2, or if $\alpha$ is greater than $\alpha$xp, or less than $\alpha$xn, then the value of $(d\beta/dt)$ref is calculated. In the expression for $(d\beta/dt)$ref, the term "s" is the slope of the line "a" illustrated in View B illustrated on FIG. 7a. As illustrated the slope is positive so that if $\alpha$ref is positive $(d\beta/dt)$ref will be positive or negative if $\alpha$ref is negative. The line "a" in View B can have any slope desired provided the sense is consistent with the logical checks and mathematical expressions. The purpose of using this approach is to allow pitch changer 400 to slow down gradually as the selected operating condition is approached in order to reduce overshoots and hunting. Once $(d\beta/dt)$ref is determined, it is then checked against the maximum and minimum allowable values as indicated. The maximum and minimum values of $d\beta/dt$ are a function of the type of pitch changer 400 used for a specific application. As illustrated, there are four possible values of $d\beta/dt$, but only one is passed to power transfer section 103 for use by pitch changer controller 402.

Referring still to FIG. 13a when feather command is initiated, feather mode is invoked wherein $d\beta/dt$ is set to the maximum value and remains there until $\beta$ is equal to $\beta$f, as indicated by the logic check. Once the blades are in the feather position, dβ/dt is set to 0 and the system enters an energy saver mode to conserve the battery power. In a preferred embodiment this mode would shut off all power from battery 800 except for the minimal power required to maintain timing section 101 of blade control module 100 in a live state. Unfeathering is accomplished by moving command sensor transmitter into the normal operating range and starting the engine. As soon as a value of tcc/tr has been determined, normal operation will resume.

Referring still to FIG. 13a when reverse command is initiated, the reverse mode is invoked, wherein dβ/dt is set to the minimum value and remains there until β is equal to βr as indicated by the logic check. Once the blades are in the reverse position, dβ/dt is set to 0. Moving the blades out of the reverse position is accomplished by moving command sensor transmitter 203 into the normal operating range.

Referring again to FIGS. 6, 6a, 7, 7a, 11, 11a, 13, and 13a, the specific equations, units, and logic checks are illustrative in nature and are used for clarity and simplicity of explanation. The units used are in standard engineering terms, as is the nomenclature. The equations are simple algebraic functions. The logical checks are simple functions. As an example, both βc and Nc are the result of simple expressions of tcc/tr, such that tcc/tr could be used directly with appropriate changes to the simple algebraic expressions. Angular velocity and acceleration are illustrated in terms of radians/second and radians/second$^2$, respectively, a standard engineering practice. There are, however, other units of angular velocity and acceleration that may be utilized so long as the use is consistent throughout the system. Many of the logic checks use simple algebraic expressions evaluated as yes or no (true or false) which may be rearranged without changing the results of the operation, provided the check is also rearranged to be consistent with those illustrated. In a preferred embodiment of the present invention any set of units, arrangement of algebraic functions, or arrangement of logic checks that provide the same results as those illustrated may be utilized.

Referring again to FIGS. 1, 2, 8, and 9, the addition of battery 800 and combination battery charger and condition monitor 801; as illustrated in FIGS. 8–9, to the simple variable pitch or constant speed propeller, as illustrated in FIGS. 1–2, would provide a greater level of reliability, as the stored energy may be used to supplement or replace the normal power source in case its ability to produce power was compromised. This added level of reliability is a preferred embodiment for those applications which may benefit therefrom.

Figure 14:
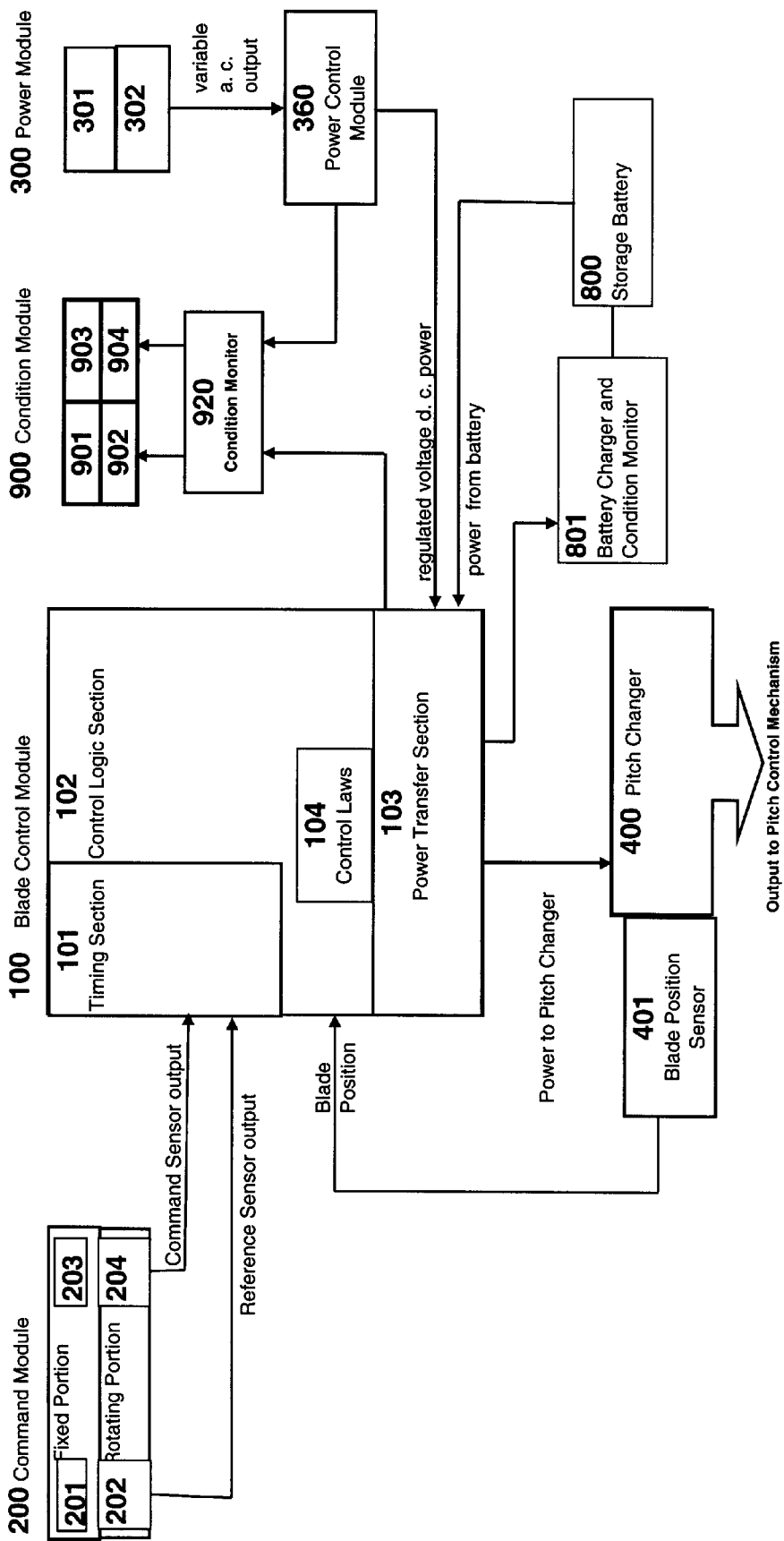
FIG. 14 is a schematic drawing of the present invention indicating the flow of power and information through the components of a constant speed or variable pitch propeller with propeller condition monitoring capability.

Referring now to FIG. 14 illustrated therein is the addition of propeller condition monitoring capability to the present invention. In a preferred embodiment, condition monitor 920 monitors the alternator and battery condition by inputs from power control module 360 and combination battery charger and condition monitor 801 transferred through power transfer section 103. In a preferred embodiment, and in its simplest form, when alternator power is in a satisfactory range, condition monitor 920 turns on the active non-contact condition sensor A transmitter 904, wherein non-contact condition sensor A receiver 903, upon receiving a signal, transmits the signal to a suitable display device. The usual display is a light on the instrument panel that is green when there is a signal within a specific time period, and red when there is no signal within a specific time period. Battery condition is obtained in the same manner, wherein the battery condition is transferred to condition monitor 920 which, when the battery condition is satisfactory, activates non-contact condition sensor B transmitter 902. Non-contact condition sensor B receiver 901, upon receiving a signal, transmits the signal to a suitable display device. The usual display is a light on the instrument panel that is green when there is a signal within a specific time period, and red when there is no signal within that specific time period.

Referring still to FIG. 14 condition monitor 920 monitors only the alternator and battery. If needed, the condition of blade control module 100, pitch changer 400, and propeller blade position could also be monitored with the incorporation of additional capability to condition monitor 920, and the incorporation of additional non-contact sensors to condition module 900.

Referring still to FIG. 14, in a preferred embodiment, and in its simplest form, the condition monitoring is in the form of an acceptable or unacceptable state. This is the most common method, and is similar to the warning lights in common automotive use. If necessary however, within the present invention lies the capability of monitoring gradations in condition by using the times measured in timing section 101 to sequentially activate the non-contact sensor transmitters. The time per revolution, tr, is measured in the propeller, and is also known or determinable from the usual engine instrumentation. By interrupting the non-contact sensor transmitter for specified multiples of tr, the display can indicate the degree of any degradation to the condition being monitored. A simple scheme as outlined below could readily be implemented.

| Degradation % | Interruption time multiple of tr | Display condition % |
|---|---|---|
| 0 | 0 | 100 |
| 25 | 4 | 75 |
| 50 | 8 | 50 |
| 75 | 12 | 25 |
| 100 | no signal | 0 |

Referring now to FIG. 15, illustrated therein is the addition of condition module 900 to the variable pitch or constant speed sectional propeller previously described in FIG. 3. The rotating portion of condition module 900 contains the transmitter halves of the non-contact condition sensors 902 and 904. The fixed portion of condition module 900 contains the receiver halves of non-contact condition sensors 901 and 903. As previously discussed, there are many types of non-contact sensors available that may be utilized for this purpose. The only additional restriction on sensor type for use as condition sensors is that the transmitter should preferably not be a passive device such as a permanent magnet, but should preferably be an active device that may be switched on and off by condition monitor 920.

Having thus described exemplary embodiments of the present invention, it should be noted by those skilled in the art that the within disclosures are exemplary only, and that various other alternatives, adaptations, and modifications may be made within the scope of the present invention. Accordingly, the present invention is not limited to the specific embodiments illustrated herein, but is limited only by the following claims.

What is claimed is:

1. A propeller blade pitch control apparatus for variable pitch operation, said apparatus comprising:

means for supplying power for changing blade pitch angle;

means for selecting blade pitch angle;

means for computing selected blade pitch angle based upon a determination of the position of a second sensor relative to a first sensor; and, means for changing the blade pitch to obtain said selected blade pitch angle.

2. The apparatus of claim 1, wherein said means for supplying power is at least one magnet alternator comprising at least one magnet portion and at least one coil portion.

3. The apparatus of claim 2, wherein said at least one permanent magnet alternator is arranged such that said at least one magnet is carried by a stationary structure proximal to the rotating propeller, and wherein said at least one coil portion is carried by said rotating propeller.

4. The apparatus of claim 3, wherein rotation of said propeller induces a current flow in said at least one coil portion via rotational passage of said at least one coil portion past said at least one magnet portion.

5. The apparatus of claim 1, wherein said means for computing selected blade pitch angle comprises at least one first non-contact sensor assembly and at least one second non-contact sensor assembly.

6. The apparatus of claim 5, wherein said at least one first non-contact sensor assembly comprises a detector sensor portion carried by the hub of said propeller and is rotationally responsive therewith, and wherein said at least one first non-contact sensor assembly further comprises said first sensor, said first sensor in the form of a non-adjustable reference sensor portion carried by a stationary structure proximal to the rotating propeller.

7. The apparatus of claim 6, wherein said at least one second non-contact sensor assembly comprises a detector sensor portion carried by the hub of said propeller and is rotationally responsive therewith, and wherein said at least one second non-contact sensor assembly further comprises said second sensor, said second sensor in the form of a azimuthally adjustable command sensor portion carried by a stationary structure proximal to the rotating propeller.

8. The apparatus of claim 7, wherein signals from said at least one first and second non-contact sensor assemblies are transmitted to said means for computing selected blade pitch angle.

9. The apparatus of claim 8, wherein said means for computing selected blade pitch angle comprises a blade control module having simple computing and timing capability, wherein said blade control module determines the current angular velocity and angular acceleration, and the position of said command sensor portion relative to said reference sensor portion upon receipt of signals from said at least one first and second non-contact sensor assemblies.

10. The apparatus of claim 9, wherein said blade control module conducts logic tests to determine said selected blade pitch angle, and wherein output from said logic tests is transmitted to said means for changing the blade pitch to said selected blade pitch angle.

11. The apparatus of claim 10, wherein said means for changing the blade pitch to said selected blade pitch angle is at least one pitch changer, and wherein said outputs from said logic tests of said blade control module are utilized to control the direction and rate of motion of said at least one pitch changer, and wherein said pitch changer provides the force and motion to at least one pitch change mechanism utilized to change the blade pitch to said selected blade pitch angle.

12. The apparatus of claim 11, wherein said at least one pitch changer is selected from the group consisting of electrical stepper motors, electrical linear actuators, electro-hydraulic units and electro pneumatic units.

13. The apparatus of claim 11, wherein said at least one pitch changer comprises the ability to be electrically driven, to be reversible, to have a variable rate, and to be sufficiently powerful to produce the maximum pitch change rate required for the specific propeller.

14. The apparatus of claim 11, wherein said at least one pitch changer is a variable speed reversible electric motor.

15. The apparatus of claim 11, wherein said at least one pitch change mechanism is at least one first beveled gear turned by said at least one pitch changer, wherein said at least one first beveled gear engages at least one second beveled gear on the propeller blade roots to rotate the blades and change said blade pitch to said selected blade pitch.

16. The apparatus of claim 11, wherein said at least one pitch change mechanism is selected from the group consisting of beveled gears, multi-gear arrangements, cam-and-gear arrangements, cam arrangements, pushrod-and-lever arrangements, and any workable combination thereof.

17. The apparatus of claim 11, wherein said at least one pitch change mechanism incorporates a blade position sensor that provides the current blade position to said blade control module.

18. The apparatus of claim 11, further comprising means for feathering the blades of the propeller.

19. The apparatus of claim 18, wherein said means for feathering comprises a blade pitch position sensor utilized to determine if and when said blades are in the feathered position, and wherein the position of said blades is fed back to said blade control module.

20. The apparatus of claim 18, wherein the feather command is accomplished by a gate protected extended travel capability for said command sensor portion of said at least one second sensor assembly.

21. The apparatus of claim 20, wherein said blade control module possesses additional logic to determine the position of said command sensor portion, wherein if said command sensor portion is in the feather position, said blade control module activates said at least one pitch changer to move said blades to said feather position.

22. The apparatus of claim 18, wherein said means for feathering further comprises an energy storage device to ensure completion of the feathering operation and to facilitate unfeathering of said blades when said means for supplying power is non-operational.

23. The apparatus of claim 22, wherein said energy storage device is recharged via means for supplying power when said means for supplying power is in operation.

24. The apparatus of claim 18, wherein placing said command sensor portion in the normal operating range results in unfeathering of said blades.

25. The apparatus of claim 11, further comprising means for reverse thrust operation.

26. The apparatus of claim 25, wherein said means for reverse thrust operation comprises a blade pitch position sensor utilized to determine that said blades are in the reverse position or in the minimum pitch position for normal operation, wherein the blade position is fed back to said blade control module.

27. The apparatus of claim 25, wherein the reverse command is accomplished by a gate protected extended travel capability for said command sensor portion of said at least one second sensor assembly.

28. The apparatus of claim 25, wherein said blade control module possesses additional logic to determine the position of said command sensor portion, wherein if said command sensor portion is in the reverse position, said blade control module activates said at least one pitch changer to drive said blades to the reverse thrust position.

29. The apparatus of claim 25, wherein said means for reverse thrust operation is obtained by setting said blade pitch to a specified position and modulating said reverse thrust and said propeller angular velocity with power variation.

30. The apparatus of claim 25, wherein moving said command sensor portion to the normal operating range results in forward thrust operation.

31. The apparatus of claim 1, further comprising means for electrically activated de-icing, wherein said de-icing means is electrically coupled to said means for supplying power.

32. A propeller blade pitch control apparatus for constant speed operation, said apparatus comprising:
    means for supplying power for changing blade pitch angle;
    means for selecting propeller angular velocity;
    means for computing selected propeller angular velocity based upon a determination of the position of a second sensor relative to a first sensor; and,
    means for changing the blade pitch to obtain said selected propeller angular velocity.

33. The apparatus of claim 32, wherein said means for supplying power is at least one magnet alternator comprising at least one magnet portion and at least one coil portion.

34. The apparatus of claim 33, wherein said at least one permanent magnet alternator is arranged such that said at least one magnet is carried by a stationary structure proximal to the rotating propeller, and wherein said at least one coil portion is carried by said rotating propeller.

35. The apparatus of claim 34, wherein rotation of said propeller induces a current flow in said at least one coil portion via rotational passage of said at least one coil portion past said at least one magnet portion.

36. The apparatus of claim 32, wherein said means for computing selected propeller angular velocity comprises at least one first non-contact sensor assembly and at least one second non-contact sensor assembly.

37. The apparatus of claim 36, wherein said at least one first non-contact sensor assembly comprises a detector sensor portion carried by the hub of said propeller and is rotationally responsive therewith, and wherein said at least one first non-contact sensor assembly further comprises said first sensor, said first sensor in the form of a non-adjustable reference sensor portion carried by a stationary structure proximal to the rotating propeller.

38. The apparatus of claim 37, wherein said at least one second non-contact sensor assembly comprises a detector sensor portion carried by the hub of said propeller and is rotationally responsive therewith, and wherein said at least one second non-contact sensor assembly further comprises said second sensor, said second sensor in the form of a azimuthally adjustable command sensor portion carried by a stationary structure proximal to the rotating propeller.

39. The apparatus of claim 38, wherein signals from said at least one first and second non-contact sensor assemblies are transmitted to said means for computing selected propeller angular velocity.

40. The apparatus of claim 39, wherein said means for computing selected propeller angular velocity comprises a blade control module having simple computing and timing capability, wherein said blade control module determines the current angular velocity and angular acceleration, and the position of said command sensor portion relative to said reference sensor portion upon receipt of signals from said at least one first and second non-contact sensor assemblies.

41. The apparatus of claim 40, wherein said blade control module conducts logic tests to determine said selected propeller angular velocity, and wherein output from said logic tests is transmitted to said means for changing the blade pitch to obtain said selected propeller angular velocity.

42. The apparatus of claim 41, wherein said logic tests utilize a nominal angular acceleration based upon the difference between said current angular velocity and said selected propeller angular velocity to adjust the blade pitch change rate to minimize hunting, overshoot, and undershoot of said selected angular velocity.

43. The apparatus of claim 41, wherein said means for changing the blade pitch to said selected propeller angular velocity is at least one pitch changer, and wherein said outputs from said logic tests of said blade control module are utilized to control the direction and rate of motion of said at least one pitch changer, and wherein said pitch changer provides the force and motion to at least one pitch change mechanism utilized to change the blade pitch to said selected propeller angular velocity.

44. The apparatus of claim 43, wherein said at least one pitch changer is selected from the group consisting of electrical stepper motors, electrical linear actuators, electro-hydraulic units and electro pneumatic units.

45. The apparatus of claim 43, wherein said at least one pitch changer comprises the ability to be electrically driven, to be reversible, to have a variable rate, and to be sufficiently powerful to produce the maximum pitch change rate required for the specific propeller.

46. The apparatus of claim 43, wherein said at least one pitch changer is a variable speed reversible electric motor.

47. The apparatus of claim 43, wherein said at least one pitch change mechanism is at least one first beveled gear turned by said at least one pitch changer, wherein said at least one first beveled gear engages at least one second beveled gear on the propeller blade roots to rotate the blades and change said blade pitch to said selected blade pitch.

48. The apparatus of claim 43, wherein said at least one pitch change mechanism is selected from the group consisting of beveled gears, multi-gear arrangements, cam-and-gear arrangements, cam arrangements, pushrod-and-lever arrangements, and any workable combination thereof.

49. The apparatus of claim 43, wherein said at least one pitch change mechanism incorporates a blade position sensor that provides the current blade position to said blade control module.

50. The apparatus of claim 43, further comprising means for feathering the blades of the propeller.

51. The apparatus of claim 50, wherein said means for feathering comprises a blade pitch position sensor utilized to determine if and when said blades are in the feathered position, and wherein the position of said blades is fed back to said blade control module.

52. The apparatus of claim 50, wherein the feather command is accomplished by a gate protected extended travel capability for said command sensor portion of said at least one second sensor assembly.

53. The apparatus of claim 52, wherein said blade control module possesses additional logic to determine the position of said command sensor portion, wherein if said command sensor portion is in the feather position, said blade control module activates said at least one pitch changer to move said blades to said feather position.

54. The apparatus of claim 50, wherein said means for feathering further comprises an energy storage device to ensure completion of the feathering operation and to facilitate unfeathering of said blades when said means for supplying power is non-operational.

55. The apparatus of claim 54, wherein said energy storage device is recharged via means for supplying power when said means for supplying power is in operation.

56. The apparatus of claim 50, wherein placing said command sensor portion in the normal operating range results in unfeathering of said blades.

57. The apparatus of claim 43, further comprising means for reverse thrust operation.

58. The apparatus of claim 57, wherein said means for reverse thrust operation comprises a blade pitch position sensor utilized to determine that said blades are in the reverse position or in the minimum pitch position for normal operation, wherein the blade position is fed back to said blade control module.

59. The apparatus of claim 57, wherein the reverse command is accomplished by a gate protected extended travel capability for said command sensor portion of said at least one second sensor assembly.

60. The apparatus of claim 57, wherein said blade control module possesses additional logic to determine the position of said command sensor portion, wherein if said command sensor portion is in the reverse position, said blade control module activates said at least one pitch changer to drive said blades to the reverse thrust position.

61. The apparatus of claim 57, wherein said means for reverse thrust operation is obtained by setting said blade pitch to a specified position and modulating said reverse thrust and said propeller angular velocity with power variation.

62. The apparatus of claim 57, wherein moving said command sensor portion to the normal operating range results in forward thrust operation.

63. The apparatus of claim 32, further comprising means for electrically activated de-icing, wherein said de-icing means is electrically coupled to said means for supplying power.

* * * * *